(12) United States Patent
Goun et al.

(10) Patent No.: US 12,571,907 B2
(45) Date of Patent: Mar. 10, 2026

(54) INVERSE SYNTHETIC APERTURE, MULTIBAND RADAR DETECTION OF HIDDEN OBJECTS WITH SPATIALLY STRUCTURED TRACKING OF OBJECT CARRIER

(71) Applicant: The Trustees of Princeton University, Princeton, NJ (US)

(72) Inventors: Alexei Goun, Plainsboro, NJ (US); Herschel Rabitz, Lawrenceville, NJ (US)

(73) Assignee: The Trustees of Princeton University, Princeton, NJ (US)

( * ) Notice: Subject to any disclaimer, the term of this patent is extended or adjusted under 35 U.S.C. 154(b) by 524 days.

(21) Appl. No.: 17/920,270

(22) PCT Filed: Apr. 21, 2021

(86) PCT No.: PCT/US2021/028396
§ 371 (c)(1),
(2) Date: Oct. 20, 2022

(87) PCT Pub. No.: WO2021/216707
PCT Pub. Date: Oct. 28, 2021

(65) Prior Publication Data
US 2023/0194702 A1 Jun. 22, 2023

Related U.S. Application Data

(60) Provisional application No. 63/013,738, filed on Apr. 22, 2020.

(51) Int. Cl.
*G01S 13/90* (2006.01)
*G01S 13/88* (2006.01)

(52) U.S. Cl.
CPC ........ *G01S 13/9064* (2019.05); *G01S 13/887* (2013.01)

(58) Field of Classification Search
CPC .. G06V 20/52; G06V 2201/05; H04B 7/0413; G01S 13/887; G01S 13/878; G01S 13/9064; G01S 13/89; G01S 7/40; G01S 13/04; G01S 13/888; G01S 13/726; G01S 13/90; G01S 13/9004; G01S 17/894; G01S 7/411; G01S 17/89
See application file for complete search history.

(56) References Cited

U.S. PATENT DOCUMENTS

2008/0228062 A1* 9/2008 Zwirn .................. A61B 5/0046
600/407
2009/0322873 A1* 12/2009 Reilly .................... G01S 7/411
348/143
(Continued)

FOREIGN PATENT DOCUMENTS

DE 102010051207 A1 * 5/2012 ........... G01S 13/867
EP 3425422 A1 6/2018
(Continued)

OTHER PUBLICATIONS

International Search Report and Written Opinion for corresponding PCT Application No. PCT/US2021/028396, dated Aug. 6, 2021.
(Continued)

*Primary Examiner* — Vladimir Magloire
*Assistant Examiner* — Peter Davon Doze
(74) *Attorney, Agent, or Firm* — Meagher Emanuel Laks Goldberg & Liao, LLP

(57) ABSTRACT

Systems and methods are described, and one system includes a three-dimensional (3D) geometric tracker connected to a multiband (MB) inverse synthetic aperture array radar (ISAR), and a classification/alarm logic. The MB ISAR includes spatially distributed radar transmitters (TXs) and receivers (RXs), a TX/RX allocation logic, and a tomographic (TM) image logic. The TX/RX allocation logic is configured to receive 3D tracking data from the 3D
(Continued)

geometric tracker, indicating subject 3D position and 3D orientation and, in response, dynamically allocate TXs and RXs to maintain MB illumination of and maintain MB reception of multiple scatter angles from subjects. The TM image processor is configured to construct TM images from the scatter angles, using 3D tracking data, for input to the classification and alarm logic. Optionally, the TX/RX resource allocation logic is configured to receive situation feedback data, for feedback adjusting of allocation of TXs and RXs.

8 Claims, 8 Drawing Sheets

(56) References Cited

U.S. PATENT DOCUMENTS

2019/0072663 A1\* 3/2019 Kuznetsov ............. H01Q 13/06
2020/0150268 A1\* 5/2020 Maschhoff ........... G01S 13/955

FOREIGN PATENT DOCUMENTS

WO        2018147929 A2      8/2018
WO        2020023601 A1      1/2020
WO     WO-2020023603 A1 *   1/2020   ......... G01R 33/0094

OTHER PUBLICATIONS

Bray, P. J., "NMR and NQR studies of boron in vitreous and crystalline borates", Inorganica Chimica Acta (1999), 158-173, 289, Elsevier.

Lavric, Z. et al., "Application of 14N NQR to the study of piroxicam polymorphism", Journal of Pharmaceutical Sciences (2010), 4857-4865, , 99(12), Wiley-Liss, Inc. and the American Pharmacists Association.

Smith, J. A. S., "Nuclear Quadrupole Resonance Spectroscopy General principles", Journal of Chemical Education (1971), 39-48, 48(1).

Tantum, S. L. et al., "Signal processing for NQR discrimination of buried land mines", Detection and Remediation Technologies for Mines and Minelike Targets IV (1999), vol. 3710, AeroSense '99, Orlando, FL, United States (1999), 474-482.

\* cited by examiner

INVERSE SYNTHETIC APERTURE, MULTIBAND RADAR DETECTION OF HIDDEN OBJECTS WITH SPATIALLY STRUCTURED TRACKING OF OBJECT CARRIER

CROSS REFERENCE TO RELATED APPLICATION

This application claims priority from U.S. Provisional Patent Application Ser. No. 63/013,738 filed Apr. 22, 2020, which is hereby incorporated by reference herein in its entirety.

TECHNICAL FIELD

This application pertains to concealed item detection via radio frequency (RF) illumination and imaging.

BACKGROUND

Long wavelength (LW) radio frequency (RF) scanning is among techniques for non-intrusive scanning of persons to detect various prohibited items, e.g., firearms, bladed weapons, and explosives that may be concealed, for example, under clothing or in backpacks or other carry items. A significant benefit of LW RF scanning is an ability to penetrate and detect such items through clothing, even heavy clothing, and through canvas and leather structure of backpacks and briefcases, without requiring RF energy potentially approaching health-concerning levels.

However, conventional LWRF techniques have substantial shortcomings. One is that images produced by currently practicable, fieldable LWRF system images can have poor spatial resolution, i.e., lack of sharpness and detail, that can render such LWRF systems as unacceptable or not preferrable, at least for certain applications. As an illustration, meeting security concerns in some environments and applications may require systems that perform to a high true positive rate (TPR), i.e., exhibit a very low rate of missed detections, also term "false negative." Configuring a conventional LWRF-based system to meet such requirements can result in a system that exhibits what may be an unacceptable rate of false positives, i.e., too often triggers the alarm when no threat is present. False alarms can incur significant costs. These can include, but are not limited to, time and manpower expense to resolve the alarm, stress and inconvenience to the false alarm subject, and stress and inconvenience to others witnessing the actions.

One adaptation for the above technical problem can be to reduce the target accuracy, i.e., lower the target TPR, i.e., settle for a higher than desired rate of failed detections. Another adaptation can be imposition of intrusive screening measures, such as requiring subjects to stand for individual scanning, or even pat downs, as well as open backpacks. Such measures can impose multiple costs. These include, but are not limited to, costs of hiring or contracting skilled screening personnel, and costs of screening equipment, e.g., hand-held trace detectors. Another cost can be the inconvenience to subjects and the reduced portal throughput.

SUMMARY

This Summary is provided to introduce a selection of concepts in a simplified form. These, as well as other concepts, are further described below in the Detailed Description. This Summary is not intended to identify key features or essential features of the claimed subject matter, nor is it intended to be used to limit the scope of the claimed subject matter.

It will be understood that the scope and meaning of all language appearing in the Summary, including individual words and terms, multi-word phrases and combinations thereof, are subject to reading the disclosure in entirety.

Among systems for detecting and classifying concealed objects, an example can include a multiband inverse synthetic aperture array radar (ISAR) system communicatively connected to a three-dimensional (3D) geometric tracker, configured to detect within a monitor area a position and an orientation of a subject or object of interest, and provide to the multiband ISAR system a corresponding subject 3D position data and orientation data. The multiband ISAR system can be configured to transmit from a first position a first frequency band radar signal and, from a second position, a second frequency band radar signal. In an embodiment, the multiband ISAR system can be configured to receive a plurality of different angles of scatter from the subject of the first radar signal and a plurality of different angles of scatter of the second radar signal. The multiband ISAR system can be configured to construct a first frequency band tomographic (TM) image of an item on the subject, from at least two different angles of scatter of the first radar signal, and to construct a second frequency band TM image of the item on the subject, based at least in part on the subject 3D position data, the subject 3D orientation data, and at least two different angles of scatter of the second radar signal. The system can include a threat alarm logic, configured to determine, based at least in part on the first frequency TM image, or the second frequency TM image, or both, whether a threat likelihood meets a trigger threshold and, in response to a positive determination, to activate an alarm.

Among methods for concealed threat detection and classification, one example can include detecting within a monitor area a position of a subject and an orientation of the subject, and correspondingly generating a subject 3D position data and a subject 3D orientation data, and transmitting from a first position a first frequency radar signal and from a second position a second frequency radar signal. The example can include receiving, from the subject, a plurality of different angles of scatter of the first frequency radar signal and a plurality of different angles of scatter of the second frequency radar signal and constructing a first frequency (TM) image of an item on the subject, based at least in part on the subject 3D position data, the subject 3D orientation data, and at least two of the different angles of scatter of the first frequency radar signal. The example can include constructing a second frequency TM image of the item on the subject, based at least in part on the subject 3D position data, the subject 3D orientation data, and at least two of the different angles of scatter of the second frequency radar signal. The example can include determining, based at least in part on the first frequency TM image, or the second frequency TM image, or both, whether a threat likelihood meets an alarm trigger condition.

BRIEF DESCRIPTION OF THE DRAWINGS

Description of various concepts and embodiments includes references to the accompanying figures which show illustrative, not limitative examples. It will be understood that figure graphics are scaled for readability and therefore various functions and features are not necessarily drawn with a scale consistent with physical implementations.

DETAILED DESCRIPTION

Figure 1:
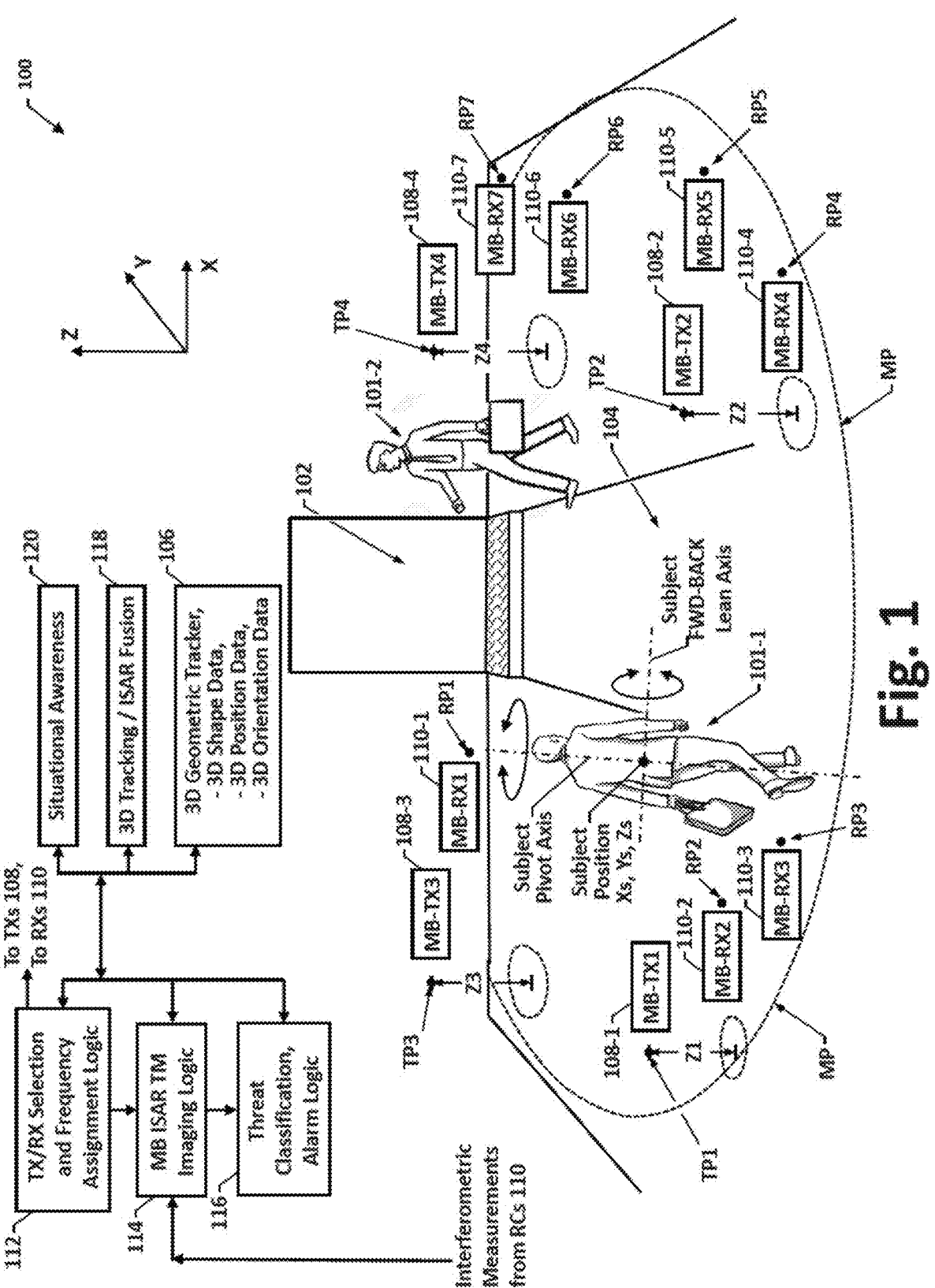
FIG. 1 shows a functional block schematic of one example implementation of one 3D geometric tracking assisted, multi-band, multi-angle inverse synthetic aperture radar (ISAR) concealed threat detection system, in accordance with one or more embodiments.

As used in this herein, "e.g." and "for example" are mutually interchangeable without change in meaning, and each will be understood to mean "for example, but not limited to."

The articles "a'" and "an," as used herein in the specification and in the claims, unless clearly indicated to the contrary, will be understood to mean '"at least one.

The term "or" as used herein in contexts such as "A or B" mean either A or B or so conjoined, i.e., elements that are conjunctively present in some cases and disjunctively present in other cases.

For purposes of this description, the meaning of "subject" will be understood as anything capable of carrying a concealed prohibited item, including, but not limited to a person, a robot, autonomous or remote controlled, terrestrial or airborne, as well as an animal, e.g., a pet dog. The meaning of "subject" will also be understood to include the collection or combination of any "subject" as defined hereinabove and any object on the subject, and "object on the subject" includes any object carried by the subject, carried in or under an apparel worn by the subject, any object secured to, adhered to, attached to, mounted to, or fastened to the subject, and any object mounted in, contained in, contained by, or surgically implanted in, the subject.

Description of concepts and features includes reference to example implementations shown on the appended drawings, which form part of this disclosure. The example implementations are not intended as a limitation on practices of disclosed concepts and embodiments.

An embodiment can include a three-dimensional (3D) geometric tracker, in combination with a dynamically reconfigurable multi-band (MB), distributed multi-transmitter/ multi-receiver inverse synthetic aperture radar (ISAR) subsystem, and an item classifier/alarm logic.

For brevity, description hereinafter will alternatively recite "inverse synthetic aperture radar" as "ISAR," "multiband" as "MB," "transmitter" as "TX," and "receiver" as "RX." Accordingly, description hereinafter will alternatively recite "multi-band, distributed multi-transmitter/multi-receiver inverse synthetic aperture radar subsystem as "MB multiple TX/RX ISAR sub-system."

In an embodiment, the dynamically reconfigurable MB, distributed multi-TX/multi-RX ISAR sub-system can include a spatially distributed population of real-time configurable radar TXs and a spatially distributed population of real-time configurable radar RXs, the TXs and RXs being communicatively connected to a TX/RX allocation and configuration logic. The radar RXs can include, in one or more embodiments, respective interferometric measurement logic.

The dynamically reconfigurable MB, distributed multi-TX/multi-RX ISAR sub-system can include, in accordance with one or more embodiments, a TM image construction logic. The TM image construction logic can be communicatively connected to the radar RXs and to the 3D geometric tracker. In one or more embodiments, population and distribution of the radar RXs, combined with radar EX allocation and configuration features of the can enable, but are not limited to, reception of various angles of scatter, from the subjects, of the different transmitted radar signals. Operational features include, without limitation, configuration of the radar TXs to effect illumination of a subject with a particular radar signal from a particular radar TX, and configuration of the radar RXs that includes assigning one among the radar RXs to receive one scatter angle of the radar signal and assigning another, differently positioned one of the radar RXs to receive another scatter angle of the radar signal. In an embodiment, the radar RXs include interferometric measurement logic. Accordingly, in the above example, the radar RXs assigned to receive the respective two scatter angles of the radar signal can provide to the tomographic image processor a respective first scatter angle interferometric measurement and second scatter angle interferometric measurement. In an embodiment, the TM image processor receives the detected subject's 3D position data and 3D orientation data from the 3D geometric tracker. The 3D position and 3D orientation data enables the TM image processor to resolve ambiguities and combine the first scatter angle interferometric measurement and second scatter angle interferometric measurement into a TM image. The TM image processor can be configured to then provide the TM image to the item classifier/alarm logic.

As described above, the TM image processor can be configured to provide the constructed TM image to the classifier/alarm logic. For reasons including, but not limited to, quality of the TM image or configuration of the classifier/alarm logic, or both, final classification of the subject is not necessarily determined from the one TM image. In an embodiment, TM image processor can therefore receive, from one or more of the radar RXs, successive interferometric measurements of the subject. For the multiple TX/RX ISAR sub-system to obtain the successive interferometric measurements of the subject, especially as the subject moves within the monitored area, the TX/RX selection and assignment logic can be configured to dynamically update the assignment of radar TXs and radar signal frequencies to the subject, and correspondingly dynamically update the assignment of radar RXs to receive different scatter angles of the radar signals. The TX/RX selection and assignment logic can be configured to perform the updates based, for example, on 3D position data and 3D orientation data from the 3D geometric tracker, and the above-described distribution map of the radar TXs and radar RXs. The distributed transmitter and receiver approach in this application provides multiple observation points, which in turn provides a technical solution to difficult reconstruction in ISAR.

In an embodiment, can include a 3D tracking and ISAR fusion logic 118, which can be configured to adjust the allocation of radar TXs and corresponding allocation of radar RXs based, for example, on allocating higher frequencies for increasing detail and lower frequencies for greater penetration.

The TX/RX allocation and configuration logic can be configured to receive, via 3D tracking information from the 3D geometric tracker, updates of the 3D position and 3D orientation of subjects in the monitored area. In an embodiment, the TX/RX allocation and configuration logic can be configured to dynamically allocate and configure TXs among the spatially distributed population, based at least in part on the real-time updates of the 3D position and 3D orientation information, and a mapping of the spatial distribution of the radar TXs, to provide a dynamically updated, movement adaptive, MB radar illumination of subjects within the monitored area.

In an embodiment, the TX/RX allocation and configuration logic can be configured to perform, for example and without limitation, initial assignment to a subject, e.g., upon detection by the 3D geometric tracker, a first frequency band (FB) radar signal from one of the radar TXs and a second FB radar signal from another of the radar TXs. The TX/RX allocation and configuration logic can be further configured to also perform, for example and without limitation, assign, assignment of one or more of the radar RXs to receive scatter angles of the described first FB radar signal and scatter angles of the second FB radar signal. The TX/RX allocation and configuration logic can be configured to base the radar RX assignment, similar to the radar TX assignment, at least in part, on a mapping of the radar RXs' positions.

In an aspect, population and distribution of radar TXs can be configured to enable, for example, over the entirety of the monitored area, the described MB illumination to be from mutually displaced, different ones of the radar TXs. For example, corresponding to 3D tracking information from the 3D geometric tracker showing a subject at a position, the TX/RX allocation and configuration logic may assign a first radar TX at a first position to transmit a first frequency band radar signal, or sequence of such signals, and assign a second radar TX at a second position to transmit a second frequency band radar signal, or sequence thereof. The TX/RX allocation and configuration logic can be configured to base the assignment at least in part on a mapping, e.g., stored in a memory accessible to TX/RX allocation and configuration logic, of the radar TXs' positions, in combination with the subject's position provided by the 3D geometric tracker.

Regarding the phrase "frequency band," it will be understood that the scope and meaning of the phrase must be adjusted or adapted in accordance with, i.e., to meaningfully align to, the various different radar modulation scheme(s) in which radar TXs and radar RXs can be configured for practices in accordance with the disclosed embodiments. For example, as described in greater detail in later sections, "chirped radar" can be among the modulation schemes that may be utilized, For chirped radar implementations, each of the frequency bands can be defined, for example, by a pair of frequency limits, e.g., a band-specific lower frequency limit and a band-specific upper frequency limit. The limits can be expressed, for example, in Hertz (Hz). In one or more implementations of chirped radar, the respective frequency bands defined by the band specific upper and lower frequency limits of one frequency band may be, but are not necessarily, mutually exclusive of respective frequency bands defined by said limits for other of the frequency bands.

For example, in one or more embodiments, MB illumination of a subject may include illumination by a first FB chirped radar signal, e.g., from a first radar TX at a first position, and by a second FB chirped radar signal, e.g., from a second radar TX at a second position. The first FB chirped radar signal can be transmitted, for example, within a first periodic interval, and the second FB chirped radar signal can be transmitted, e.g., within a second periodic interval. In an embodiment, the first periodic interval and the second periodic interval may have the same or may have different periodicities, and their respective active transmissions may be mutually exclusive, or may overlap, in full or in part. In one or more embodiments, the respective band-specific upper frequency limit and lower frequency limit of the first FB chirped radar signal and the second FB chirped radar signal, viewed as limits reached over the durations of the respective signals, may differ from one another or may be the same.

As another example, in one or more embodiments, MB illumination of a subject may include illumination by a first frequency modulated continuous wave radar ("FMCW") signal, e.g., from a first radar TX at a first position, and by a second FMCW radar signal, e.g., from a second radar TX at a second position. In an embodiment, the respective band-specific upper frequency limits and lower frequency limits of the first FB FMCW radar signal and second FB FMCW radar signal may be mutually non-overlapping, or may have partial or complete mutual overlap.

As another example, in one or more embodiments, MB illumination of a subject may include illumination by a first FB direct sequence spread spectrum ("DSSS") radar signal, e.g., from a first DSSS radar TX at a first position, and by a second FB DSSS radar signal, e.g., from a second DSSS radar TX at a second position. In an embodiment, the respective band-specific upper frequency limits and lower frequency limits of the first FB DSSS radar signal and second FB DSSS radar signal may be mutually non-overlapping, or may have partial or complete mutual overlap.

As another example, in one or more embodiments, MB illumination of a subject may include illumination by a first ultra-wideband (UWB) radar signal, e.g., from a first UWB radar TX at a first position, and by a second UWB radar signal, e.g., from a second UWB radar TX at a second position. For purposes of this description, the meaning of "ultrawide band" encompasses but is not limited to the definition of ultrawide band under Title 47, Code of Federal Regulations, Subpart F, § 15.503 and § 15.113, and any updates thereto. In an embodiment, the respective band-specific upper frequency limits and lower frequency limits of the first FB UWB radar signal and the second FB UWB radar signal may be mutually non-overlapping, or may have partial or complete mutual overlap.

It will be understood that the above example radar modulation schemes, chirp, FMCW, DSSS, and UWB radar are only illustrative examples, and are not intended as limitations on practices in accordance with disclosed embodiments. Other examples can include, without limitation, MB illumination of a subject by a plurality of FB frequency-hopping radar signals, either from the same radar TX, or from a plurality of radar TXs, or both. Examples can also include MB illumination of a subject by a plurality of different radar modulation schemes, e.g., by any combination or sub-combination from among chirped radar signals, FMCW radar signals, frequency hopping radar signals, DSSS radar signals, and/or UWB radar signals.

As described in greater detail in later sections of this disclosure, operations by the classifier/alarm logic can include computation or other determination of a confidence factor, which is a measure of a confidence in the classification of the subject. In an embodiment, the TX/RX selection and assignment logic can be configured to receive the confidence factors, or to receive candidate classifications, or both, and to factor the confidence factors, or candidate classifications, or both, in dynamic updating of the assignment of radar TXs, radar signal frequencies, and radar RXs to receive different scatter angles of the radar signals.

FIG. 1 shows a functional block schematic of an example implementation 100 of one 3D geometric tracking assisted, multi-band, multi-angle inverse synthetic aperture radar (ISAR) concealed threat detection system, in accordance with one or more embodiments. For purposes of example, the reference environment for describing the implementation 100 (hereinafter referred to as "system 100") is a venue having an entryway 102 through subjects can pass. Examples of such venues can include, but are not limited to, a school, a place of worship, a sports arena, a concert hall, a movie theater, a retail establishment. It will be understood that the form and configuration of the entryway 102 visible in FIG. 1 is only an example and not intended as a limitation on practices in accordance with disclosed embodiments. For example, other venues in which embodiments can be implemented and practiced can include, but are not limited to, open area parks, or particular areas within such parks, and certain outdoor areas temporarily bounded, e.g., via crowd control barriers, such as at outdoor musical festivals and at organized marathons, e.g., the Boston Marathon. It will be understood that in the above identified and other examples of other venues, the form and configuration of the entryway may substantially differ from the FIG. 1 entryway 102.

Further regarding venues, systems and methods according to one or more embodiments can be implemented and practices in various venues that include areas encompassing or proximal to moving structures. Examples can include but are not limited to, automobile parking lots, areas surrounding amusement park rides, and platforms or other standing areas adjacent, e.g., passenger train tracks, subway tracks, or short-route shuttle tracks, e.g., tracks for intra-airport shuttle trains or Disneyworld® trains. In such venues, the form and configuration of the entryway may differ substantially from the FIG. 1 entryway 102. In addition, in such venues the various moving structures, e.g., moving automobiles, moving train cars, shuttle cars, and amusement ride structures, can intermittently pass adjacent subjects. As will be described in greater detail in later sections of this disclosure, technical features of one or more embodiments can include features for exploiting the radar reflectivity of the moving structures, or features for mitigating effects of the radar reflectivity of the moving structures, or both.

Further regarding venues, systems and methods according to one or more embodiments can be implemented and practices in various venues that include areas encompassing or proximal to moving structures. Examples can include but are not limited to, automobile parking lots, areas surrounding amusement park rides, and platforms or other standing areas adjacent, e.g., passenger train tracks, subway tracks, or short-route shuttle tracks, e.g., tracks for intra-airport shuttle trains or Disneyworld® trains. In such venues, the form and configuration of the entryway may differ substantially from the FIG. 1 entryway 102. In addition, in such venues the various moving structures, e.g., moving automobiles, moving train cars, shuttle cars, and amusement ride structures, can intermittently pass adjacent subjects. As will be described in greater detail in later sections of this disclosure, technical features of one or more embodiments can include features for exploiting the radar reflectivity of the moving structures, or features for mitigating effects of the radar reflectivity of the moving structures, or both.

In an embodiment, the system 100 can include a (3D) geometric tracker 106, configured to detect 3D shape, track 3D position and track 3D orientation of subjects within an area, termed for purposes of this description as the "monitored area." In an embodiment the system 100 can include a spatial distribution of MB radar TXs, such as a first MB radar TX 108-1, a second MB radar TX 108-2, a third MB radar TX 108-3, and a fourth MB radar TX 108-4 (collectively referenced as "MB radar TXs 108."). In an embodiment, the system 100 can include a spatial distribution of MB radar RXs, such as a first MB radar RX 110-1, a second MB radar RX 110-2, a third MB radar RX 110-3, a fourth MB radar RX 110-4, a fifth MB radar RX 110-5, a sixth MB radar RX 110-6, and a seventh MB radar RX 110-7, (collectively referenced as "MB radar RXs 110").

Regarding the monitored area, examples can include a funnel-in walking approach to the entryway 102, or can include gathering areas for subjects prior to entry, or can include both. FIG. 1 shows an example monitored area bounded by a perimeter line, labeled MP, and the example is shown centered at the entryway 102. It will be understood that the relative geometry and shape of the perimeter line MP, as well as the relative dimension of MP, e.g., as compared to the subjects 102, is only an arbitrary example, not a limitation. The distance of the perimeter line MP from the entryway 102, and hence the area of the monitored area, can be fixed or can be adjustable. Adjustment, if included, may be configured to be performed, for example, in response to events, or can be based on time of day, or other factors. An example factor can be crowd density, e.g., increasing the distance of the perimeter line MP in response to sparse crowds and decreasing the distance in response to dense crowds.

In the FIG. 1 implementation of system 100, the MB radar RXs 110 are not shown co-located with the MB radar TXs 108. This is only an example configuration and implementations of one or embodiments include some or all of the MB radar RXs being co-located with a corresponding MB radar TX. One example is described in later paragraphs, in reference to FIG. 2.

It will be understood that the FIG. 1 population of four MB radar TXs 108 and seven MB radar RXs 110 is only an example, selected for reasons including convenience of description, is not intended as a limitation on the scope of practices according to disclosed embodiments.

The respective positions of the MB radar TXs 108 are labeled TP1, TP2, TP3, and TP4 (collectively referenced herein as "TPs".) The MB radar TXs 108 are positioned at different heights, labeled in accordance with the example X, Y, Z reference axis set as Z1, Z2, Z3, and Z4. The respective positions of the MB radar RXs 110 are labeled RP1, RP2, RP3, RP4, RP5, RP6, and RP7 (collectively referenced herein as "RPs").

In embodiment, the MB radar TXs 108 can be configured to each transmit up to k different frequency band radar signals. As described above, the scope and meaning of "frequency band" can depend, at least in part, on the particular radar modulation scheme used by the MB radar TXs 108 and MB radar RXs 110. The number k can be, but is not necessarily the same for all of the MB radar TXs 108. The frequency assignment can be as indicated by the following Table 1. In the Table I format $v_1^m$, $v_2^m$ ... $v_k^m$ the "m" superscript index indicates the particular MB radar TX 108 and the subscript is the frequency band index. For example $v_1^3$ refers to the first frequency band index of the third MB radar TX 108-3, and $v_2^3$ refers to the second frequency band index of the third MB radar TX 108-3.

TABLE 1

| Specific TX 108 | Frequency Assignments |
| --- | --- |
| 108-1 | $v_1^1$, $v_2^1$ ... $v_k^1$ |
| 108-2 | $v_1^2$, $v_2^2$ ... $v_k^2$ |
| 108-3 | $v_1^3$, $v_2^3$ ... $v_k^3$ |
| 108-4 | $v_1^4$, $v_2^4$ ... $v_k^4$ |

The MB radar TXs 108 can include local oscillators from which the assigned radar signal frequencies can be generated. For coherent operation, a selected one among the MB radar TXs 108 can be configured with a master oscillator, which can provide a master frequency reference for all of the MD radar TX 108 local oscillators. An example implementation can provide two or more of the MB radar TXs 108 with an oscillator that can be selectively enabled to operate as the master oscillator.

In an embodiment, one or more of the MB radar TXs 108 can be configured to transmit the up to k different frequency bands concurrently. In another, or the same embodiments, one or more of the MB radar TXs 108 can be configured to transmit one or more of the k different frequency bands in accordance with a first time schedule, and one or more of the k different frequency bands in accordance with a second time schedule. The first time schedule and second time schedule can be constructed as a time domain multiplexing. In an embodiment, a corresponding one or more of the radar RXs can be configured to operate in synchronization with the one or more MB radar TXs 108, to receive the radar signals. In an embodiment, one or more of the MB radar TXs 108 can include a single real-time switchable FB transmitter and single antenna, and can be configured to transmit the up to k different FBs of radar signals over a k-interval time division multiplexing scheme.

In an embodiment, the direction of the k different FB radar signals of each of the MB radar TXs 108 can be fixed, e.g., at time of installation. In another embodiment, one or more of the MB radar TXs 108 can be configured as a steerable beam radar TX.

Regarding the MB radar RXs 110, in an embodiment each of the MB radar RXs 110 can be configured to receive integer S different radar FBs. Each of the different radar S different FBs of the MB radar RXs 110 can be referenced as an "RX channel." The value of S can be, but is not necessarily, the same for all of the MB radar RXs 110. In an embodiment, the directivity of the S different RX channels of each of the MB radar RXs 110 can be fixed, e.g., at time of installation. In another embodiment, one or more of the MB radar RXs 110 can be configured as a steerable RX channel.

It will be understood by persons of ordinary skill, upon reading this disclosure in its entirety, that the populations of MB radar TXs 108 and the population of MD radar RXs 110, as well as the respective values of k and S, can be application-specific and can be, in part, design choice.

Referring to FIG. 1, in an embodiment, one example configuration for the MB radar TXs 108 can be a population and distribution of the MB radar TXs 108 such that at any position of a subject 101 within the monitored area, the subject 101 can be illuminated by one FB radar signal from one of the MB radar TXs 108, and by another frequency band radar signal, preferably from another of the MB radar TXs 108. In this and other embodiments, a corresponding example configuration for the MB radar RXs 110 can be a population and distribution of the MB radar RXs 110 such that, for the one FB radar signal from the one of the MB radar TXs 108, there is at least one MB radar RX 110 that, when enabled, can receive one of the scatter angles of that radar signal and at least one other MB radar RX 110 that, when enabled, can receive another of the scatter angles of the one signal. The corresponding example configuration for the MB radar RXs 110 can also provide, for the other FB radar signal from the other of the MB radar TXs 108, there is at least one MB radar RX 110 that, when enabled, can receive one of the scatter angles of the other radar signal and at least one other MB radar RX 110 that, when enabled, can receive another of the scatter angles of the other radar signal.

In an embodiment, provision of the above-described configuration of the MB radar TXs 108 and configuration and selective enablement of the MB radar RXs 110 can be provided by a TX/RX selection and frequency assignment logic 112. The TX/RX selection and frequency assignment logic 112 can be configured to selectively enable and configure FBs of the MB radar TXs 108, based at least in part on subject 3D position data and subject 3D orientation data from the 3D geometric tracker 106, and a position map of the MB radar TXs 108 such that, as described above, multiple radar FBs can be incident on the subject. The TX/RX selection and frequency assignment logic 112 can be configured to selectively enable and configure the MB radar RXs 110 to receive scatter angles of the illumination radar signals, as described above. The enablement and configuration can include concurrent MB illumination, sequential MB illumination, or both.

Regarding implementation of the 3D geometric tracker 106, one example can include structured light 3D detection, binocular vision 3D detection, and monocular vision with color embedded 3D detection. Implementation of the 3D geometric tracker 106 can include, e.g., mobile phone position detection, for example, in combination with any one or more of the example structured light 3D detection, binocular vision 3D detection, and monocular vision with color embedded 3D detection. Combination with mobile phone detection can provide, for example, resilience against loss of track caused by occlusion.

Physical positions within FIG. 1 are shown referenced to an example reference axis set "X, Y, Z" shown on FIG. 1. The X, Y, Z reference axis set may be, for example, the reference axis set used by the 3D geometric tracker 106. In the example system reference axis set, Z is in the height direction, X can be pointed toward true north, orthogonal to Z and tangential to the earth surface, and Y can be orthogonal to X and to Z. It will be understood that this is only one example alignment for the X, Y, Z reference axis set. One alternative alignment can be, for example, to a structure of a building within or proximal to the monitored area. In addition, the example X, Y, Z reference axis set is Cartesian but this is not a limitation. One alternative is a polar co-ordinate reference system. As illustration, an origin can be a center point of the entranceway 102, from which any position can be identified by a vector specifying rotation, elevation, and range.

In an embodiment, the MB radar RXs 110 can include interferometric measurement logic. The interferometric measurement logic can be configured such that, for each of the up to S different radar frequencies the MB radar RX 110 receives, the MB RX 110 can generate an interferometric measurement, or a sequence of interferometric measurements.

The system 100 can include an ISAR MB tomographic (TM) image construction logic 114, which can be communicatively connected to the 3D geometric tracker 106 and to the MB radar RXs 110. In an embodiment, the ISAR MB TM image construction logic 114 can receive an interferometric measurement from one of the MB radar RXs 110, corresponding to a first scatter angle from the first subject 101-1, of a radar signal from one of the MB radar TXs 108 and can receive, from another of the MB radar RXs 110, an interferometric measurement from another of the MB radar RXs 110, corresponding to a second scatter angle of said radar signal from one of the MB radar TXs 108. In an embodiment, the ISAR MB TM image processor 114 can also receive the first subject 101-1 3D position data and the first subject 101-1 3D orientation data from the 3D geometric tracker 106. The ISAR MB TM image construction logic 114 can employ the first subject 101-1 3D position and 3D orientation data to resolve ambiguities and to combine the above-described first scatter angle interferometric measurement and second scatter angle interferometric measurement into a TM image. The ISAR MB TM image construction logic 114 can be configured to provide the TM image to the threat classification/alarm logic 116. Features and implementations of the threat classification/alarm logic 116 are described in greater detail in later sections of this disclosure.

In an embodiment, the system 100 can include a plurality of databases. One example configuration of databases is described in greater detail later, in reference to FIG. 5. The plurality of databases can include, for example, database configured as a venue specific threat list. The venue specific threat list can include, for example, a list of energetics and a list of non-explosive prohibited items (NEPIs). The databases can include a benign database, configured to include known benign subjects and associated items. Another of the databases can be configured as a people traffic database storing, for example but not limited to, known and suspected adversaries, and information for special traffic, for whom NEPIs are acceptable and credentials are approved. Another database can be configured to store fixed building priors, surrounding areas priors, for purposes such as use by mitigating interference algorithms. Another of the databases can be configured to include venue specific lists, e.g., people, accesses, and alarms. Another of the databases can be configured to store venue history logs and events.

Regarding the database configured to store building and surrounding area priors, example venues can include areas encompassing or proximal to moving structures, e.g., amusement park rides, passenger train tracks, Disneyworld® trains. Such a database can be configured to store priors regarding the moving structures, for reasons including, but not limited to, mitigation of unwanted reflections from the surfaces, or exploitation of the reflections, or both.

Figure 2:
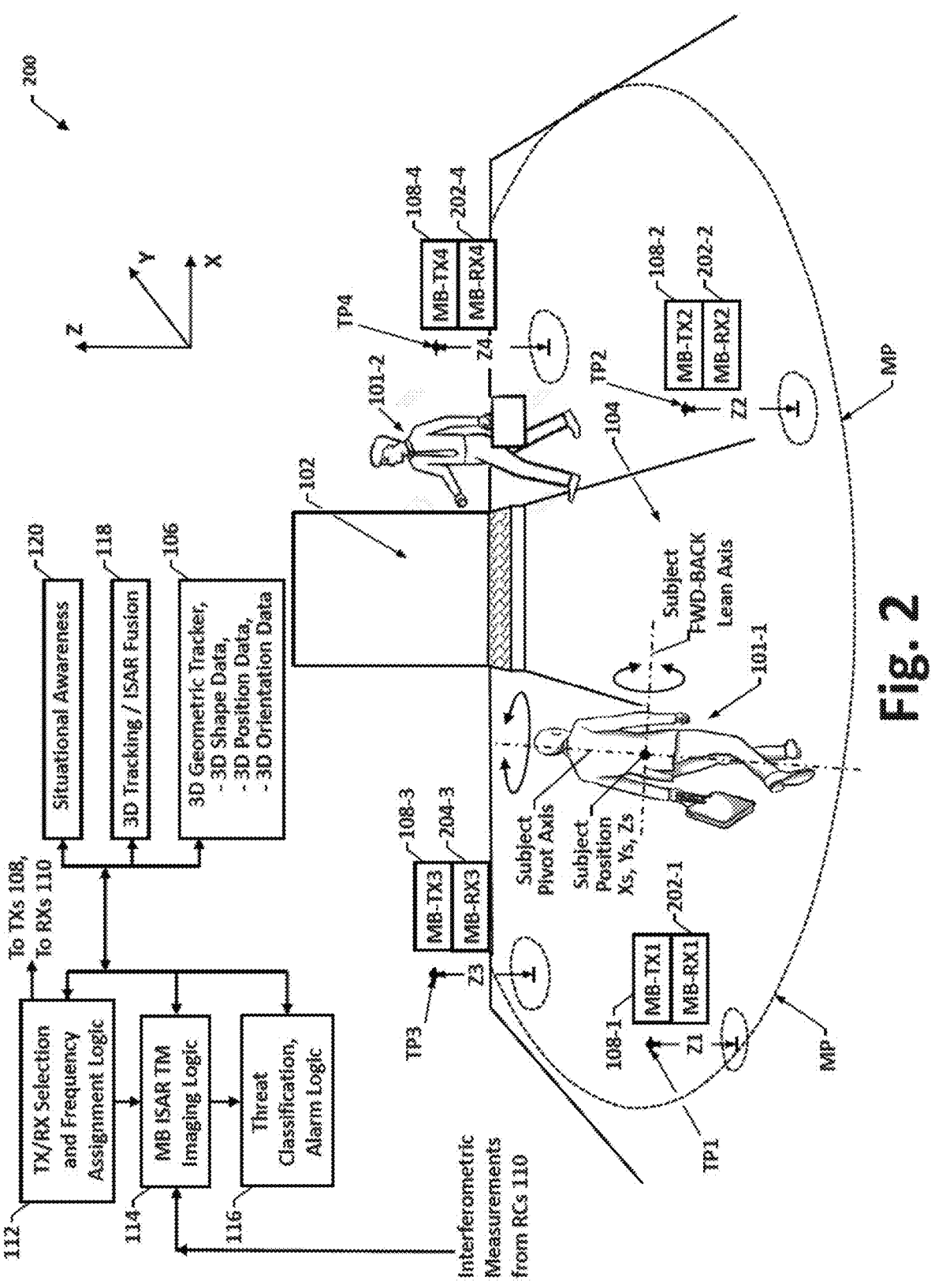
FIG. 2 shows a configuration of the FIG. 1 system that includes an arrangement of co-located radar transmitters and receivers, in accordance with one or more embodiments.

FIG. 2 shows a system 200, which is an adaptation of the FIG. 1 system that includes an arrangement of co-located MB radar TXs and MB radar RXs, in accordance with one or more embodiments. The system 200 includes, in place of the system 100 MB radar RXs 110, which were not shown co-located with the MB radar TXs 108, a first MB co-located radar RX 202-1, shown co-located with the first MB radar TX 108-1, at position TP-1. The system 200 includes, in like manner, a second MB co-located radar RX 202-2, shown co-located with the second MB radar TX 108-2, at position TP-2, a third MB co-located radar RX 202-3 and a fourth MB co-located radar RX 202-4, shown co-located respectively with the third MB radar TX 108-3 at TP-3 and the fourth MB radar TX 108-4 at TP-4.

It will be understood that the FIG. 1 MB radar RX position configuration and the FIG. 2 co-located MB radar RX configuration are not mutually exclusive.

Figure 3:
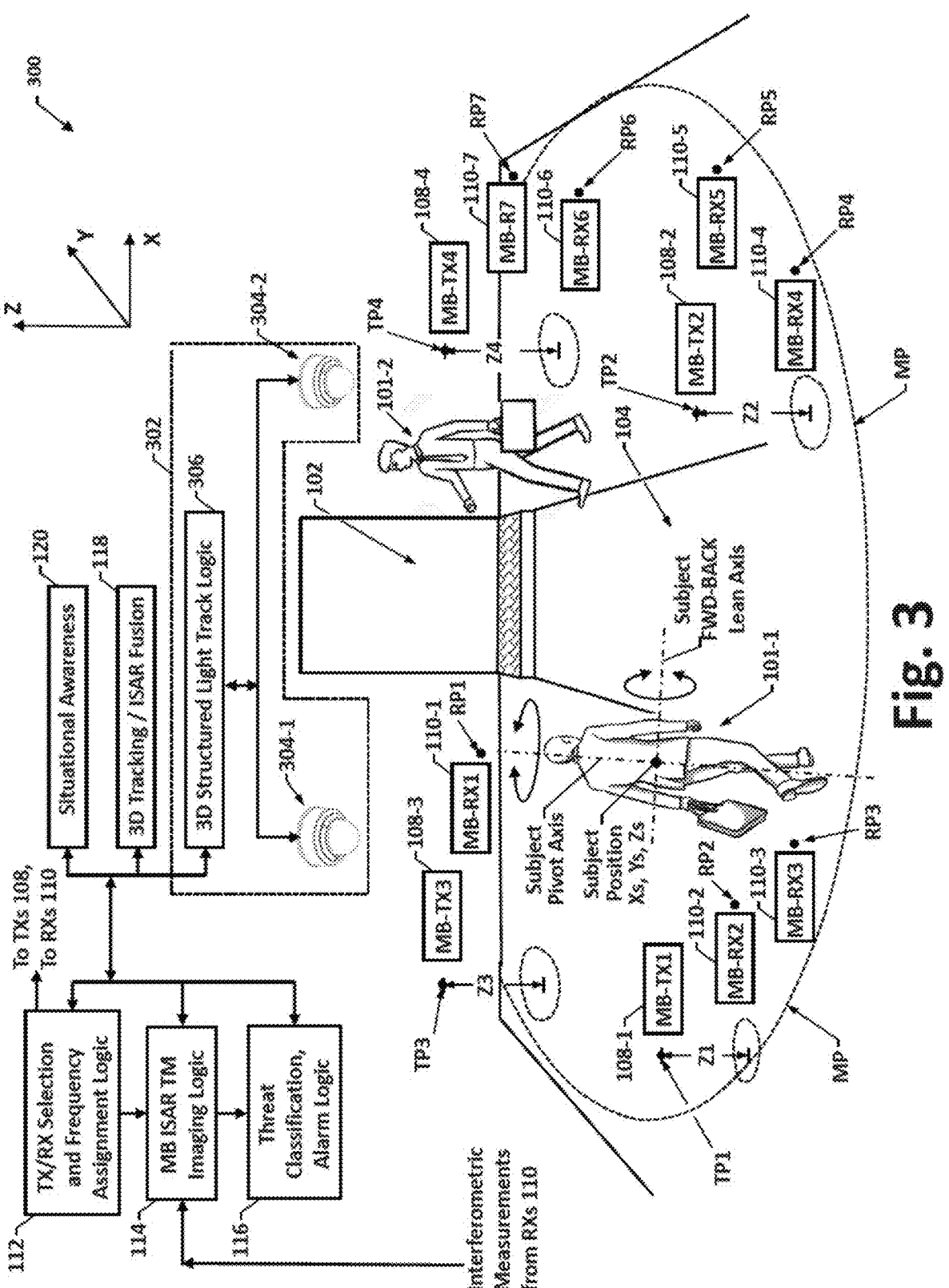
FIG. 3 shows a configuration of the FIG. 1 system, with an implementation of the 3D geometric tracker that includes a structured light 3D geometric tracking in accordance with one or more embodiments.

FIG. 3 shows a configuration 300 of the FIG. 1 system, which implements the 3D geometric tracker 106 using a structured light 3D geometric sensor/tracker 302. The structured light 3D geometric sensor/tracker 302 can include a first structured light emitter-receiver 304-1 and a second structured light emitter-receiver 304-2 (collectively, "structured light emitter—receiver units 304"), which can connect to a 3D structured light track logic 306. Implementations of the structured light 3D geometric sensor/tracker 302 can utilize, for example, conventional off-the-shelf equipment, available from various vendors. One implementation can use, for example, Kinect® from Microsoft Corporation. It will be understood, depending on the implementation of the structured light 3D geometric sensor/tracker 302, that a general purpose programmable computer, e.g., a commercially available personal computer, may be configured to perform as the 3D structured light track logic 306. It will be understood that the FIG. 3 population of two 3D structured light emitter-receiver units 304 is only for illustration; it is not a limitation. The population of structured light emitter-receiver units 304 can be greater than two and, for some applications, a single structured light emitter-receiver unit 304 may suffice. One or more of the structured light emitter-receiver units 304 can be implemented as separate hardware units, i.e., a light emitter component and a light receiver component.

Figure 4:
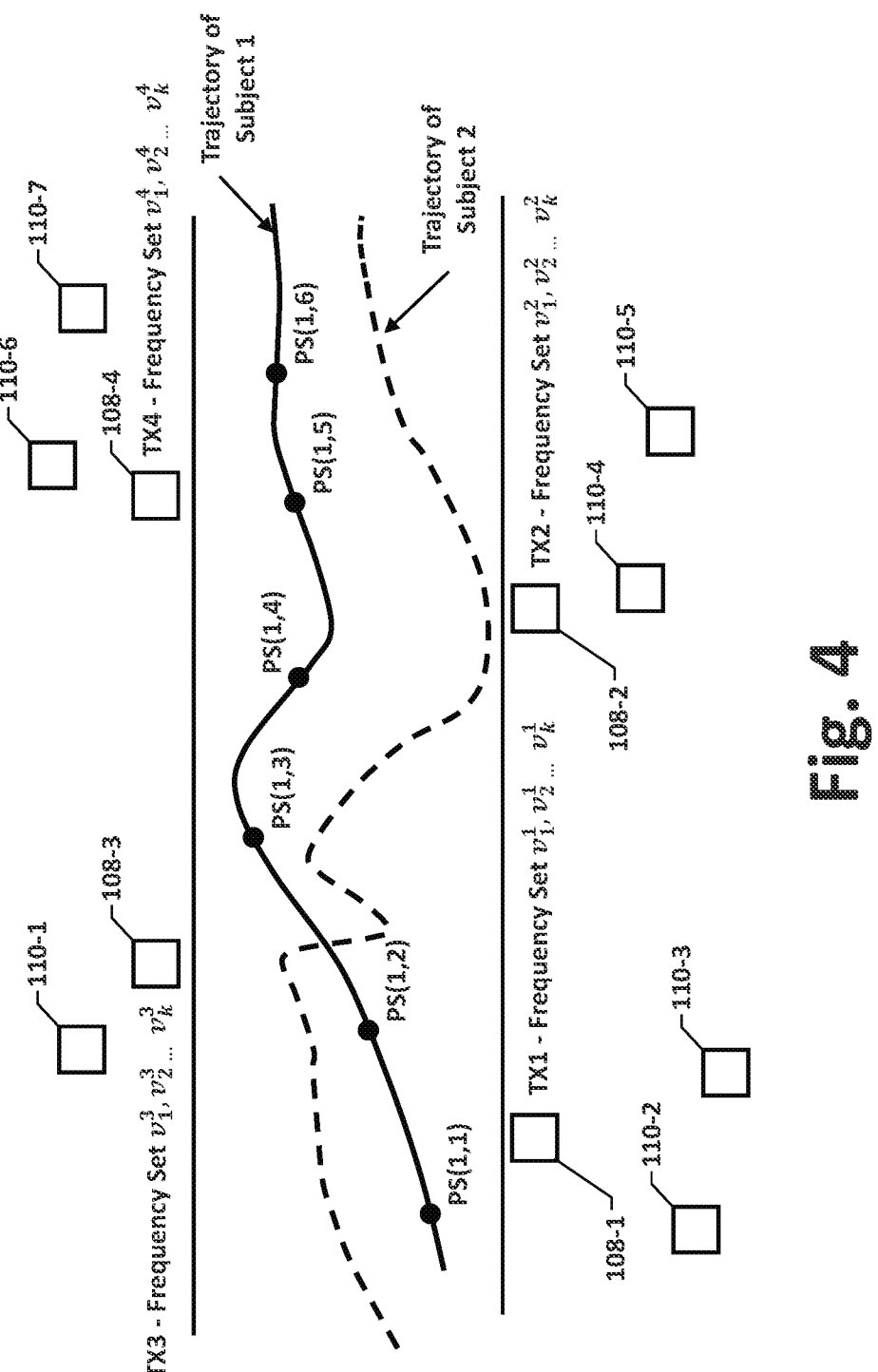
FIG. 4 shows a simulation plot of a hypothetical movement trajectory of the FIG. 1 first subject and the FIG. 1 second subject, relative to respective positions of the FIG. 1 multiband radar transmitters in accordance with one or more embodiments.

FIG. 4 shows, in a spatial relation to the FIG. 1 MB radar TXs 108, an illustrative movement trajectory 402-1 of the FIG. 1 first subject 101-1, and a similar illustrative movement trajectory 402-2 of the FIG. 1 second subject 101-2. The movement trajectories 402-1 and 402-2 (collectively "movement trajectories 402") are shown translational with respect to the X-Y-Z reference axes. To avoid added graphics that would not be further and additionally descriptive of concepts, trajectories 402-1 and 402-2 are shown as two-dimensional projections, i.e., a plane parallel the FIG. 1 X-Y axis plane. Example positions along the movement trajectory 402-1 are labeled PS(q,r), with q indicating the subject (i.e., q being "1" for subject 101-1 and "2" for subject 101-2) and r being a position index.

A scenario assumes initial detection of the first subject 101-1 at the position PS(1, 1), by the 3D geometric tracker 106. Corresponding to the detection can be an assigning to the first subject 101-1, by the TX/RX selection and frequency assignment logic 112, of MB radar TXs 108 and MB radar RXs 110 for appropriate MB illumination, scatter angle reception, and interferometric measurements. In an embodiment, determining appropriate MB illumination can include initial selection of FBs. Example factors in determining initial FBs can include, without limitation, known or estimated apparel of the subject 101-1, known or estimated weight and physique of the subject 101-1, the rate at which the subject 101-1 is moving, apriori information regarding specific types of prohibited items, and the present availability of radar TX 108 resources. Also, in an embodiment, prior to initial assignment of MB radar TX 108 and MB radar RX 110 resources by the TX/RX selection and frequency assignment logic 112, a subject identity management logic, such as described in greater detail in reference to FIG. 8, may have classified the subject 101-1 at a risk level. In an embodiment, results of such classification can be provided to the TX/RX selection and frequency assignment logic 112, and may be utilized in determining initial FBs.

As described above in reference to FIG. 1, the TX/RX selection and frequency assignment logic 112 can be configured with access to a map of positions of and to performance information regarding the MB radar TXs 108 and MB radar RXs 110. Operations by the TX/RX selection and frequency assignment logic 112, based on this information and the initial FB assignment described above, the position PS(1, 1), the 3D geometric shape data, position data, and orientation data received from the 3D geometric tracker 106 can include: determining which among the MB radar TXs 108 is (are) positioned to illuminate a surface of interest of the first subject 101-1 with the determined initial FBs; determining scatter angles from the surface of interest, and determining which among the MB radar RXs 110 is (are) able to receive the respective scatter angles.

It will be assumed that, for the initial detection of the first subject 101-1 at PS(1, 1) two FBs are determined, which will be referred to as a "first subject initial first FB" radar signal and a "first subject initial second FB" radar signal It will be assumed that based on the above-described factors the TX/RX selection and frequency assignment logic 112 assigns the first MB radar transmitter 108-1 to transmit both the first subject initial first FB radar signal and the first subject initial second FB radar signal. It will also be assumed that the TX/RX selection and frequency assignment logic 112 assigns a channel of the second MB radar RX 110-2 to receive a first angle scatter (from the surface of the first subject 101-1) of the first subject initial first FB radar signal, and assigns a channel of the first MB radar RX 110-1 to receive a second angle scatter of the first subject initial first FB radar signal. Continuing with the example, it will be assumed that the TX/RX selection and frequency assignment logic 112 assigns a channel of the third MB radar RX 110-3 to receive a first angle scatter of the first subject initial second FB radar signal, and assigns another channel of the first MB radar RX 110-1 to receive a second angle scatter of the first subject initial second FB radar signal.

Associated with the described configuration of the first MB radar RX 110-1, the interferometric measurement logic of the second MB radar RX 110-2 can be configured to perform interferometric measurement of the first angle scatter of the first subject initial first FB radar signal, the interferometric measurement logic of the third MB radar RX 110-3 can be configured to perform interferometric measurement of the first angle scatter of the first subject initial second FB radar signal, and the interferometric measurement logic of the first MB radar RX 110-1 can be configured to perform interferometric measurement of the second angle scatter of the first subject initial first FB radar signal, and interferometric measurement of the second angle scatter of the first subject initial second FB radar signal.

For purposes of description, interferometric measurement by the second MB radar RX 110-2 of the first angle scatter of the first subject initial first FB radar signal will be referred to as "initial first FB radar signal first scatter angle interferometric measurement," and interferometric measurement by the third MB radar RX 110-3 of the first angle scatter of the first subject initial second FB radar signal will be referred to as "initial second FB radar signal first scatter angle interferometric measurement." Similarly, interferometric measurement by the first MB radar RX 110-1 of the second angle scatter of the first subject initial first FB radar signal will be referred to as "initial first FB radar signal second scatter angle interferometric measurement," and interferometric measurement by the first MB radar RX 110-1 of the second angle scatter of the first subject initial second FB radar signal will be referred to as "initial second FB radar signal second scatter angle interferometric measurement."

Under control, for example, of the 3D tracking/ISAR fusion logic 118, or another logic resource, the MB tomographic imaging logic 114 can be configured to receive the above-described initial first FB radar signal first scatter angle interferometric measurement and initial first FB radar signal second scatter angle interferometric measurement, and receive, from the 3D geometric tracker 106 information indicating the subject 101-1 3D position and 3D orientation during these interferometric measurements. The MB tomographic imaging logic 114, based at least in part on the 3D geometric tracker 106 information, can resolve ambiguities and can perform tomographic construction of an image of an item carried by the first subject 101-1 through a TM combining of the initial first FB radar signal first scatter angle interferometric measurement and initial first FB radar signal second scatter angle interferometric measurement. The MB tomographic imaging logic 114 can, in like manner, be configured to receive the above-described initial second FB radar signal first scatter angle interferometric measurement and initial first FB radar signal second scatter angle interferometric measurement and, based at least in part on the 3D geometric tracker 106 information, resolve ambiguities and perform tomographic construction of another image of the item carried by the first subject 101-1 through a TM combining of the initial second FB radar signal first scatter angle interferometric measurement and initial second FB radar signal second scatter angle interferometric measurement.

As the first subject 101-1 progresses along the movement trajectory 402-1, the first subject 101-1 may move out of range of the presently assigned MB radar TX 108 and into range of another of the multiband radar TXs 1108 Based on updates from the 3D geometric tracker 106, and a priori knowledge of the MB radar TX 108 transmit power and beam configuration, the TX/RX selection and frequency assignment logic 112 can detect this, and correspondingly update the MB radar TX 108 and MB radar RX assignments to the first subject 101-1. Interspersed with the subject movement-based updating of system 100 transmit resources, and of system 100 reception and imaging resources, the ISAR MB TM image construction logic 114 can be configured to send, e.g., to the threat classification/alarm logic 116, a succession of TM ISAR radar images of the first subject 101-1.

Referring to FIGS. 1 and 4, in an embodiment, the situational awareness logic 120 or the 3D tracking and ISAR fusion logic can be configured to monitor, for example, interim classification results from the threat classification/alarm logic 116, or external situation information, or both. The situational awareness logic 120 or the 3D tracking and ISAR fusion logic can be further configured to modify or override, based on the monitoring, allocation of MB radar TX 108 and MB radar RX 110 resources by the TX/RX selection and frequency assignment logic 112. The configuration can include a greedy allocation, or a non-greedy allocation. In an embodiment, the allocation can switch from non-greedy when the number of subjects is sparse to a greedy allocation when the number of subjects is high. Such allocation can or example, detect a classification result from the threat classification/alarm logic 116, make an adjustment to an allocation of MB radar TX 108 and MB radar RX 110 resources, monitor a change in the classification result, and again make an adjustment to the allocation of MB radar TX 108 and MB radar RX 110 resources. In an embodiment, the allocation can be included in a compressed sensing feature such as, for example, described by Tai, C., Hsieh, S., and Lu, C., "Greedy Algorithms for Hybrid Compressed Sensing," arXivl908.06359v1 [eess.SP]18 Aug. 2019, which is hereby incorporated by reference in its entirety.

Referring to the movement trajectories 402, in an embodiment the trajectories 402 can be fully based on tracking data from the 3D geometric tracker 106. In an embodiment, a prediction logic can estimate the movement trajectories 402, e.g., during temporary loss of tracking data. Example implementations of such predictive generation of the position tracking data can include, but are not limited to, Kalman filters. Also, in an embodiment, compressive sensing logic can be included, and can be configured to use lower rates of updating by the 3D geometric tracker 106, or to estimate the movement trajectories 402 during loss of tracking, or both. An example can, but is not limited to, utilization of techniques as described by Dinakarababu, D., Golish, D., and Gehm, M., "Adaptive feature specific spectroscopy for rapid chemical identification," Department of Electrical and Computer Engineering, University of Arizona, 2011, which is shown for illustration.

Figure 5:
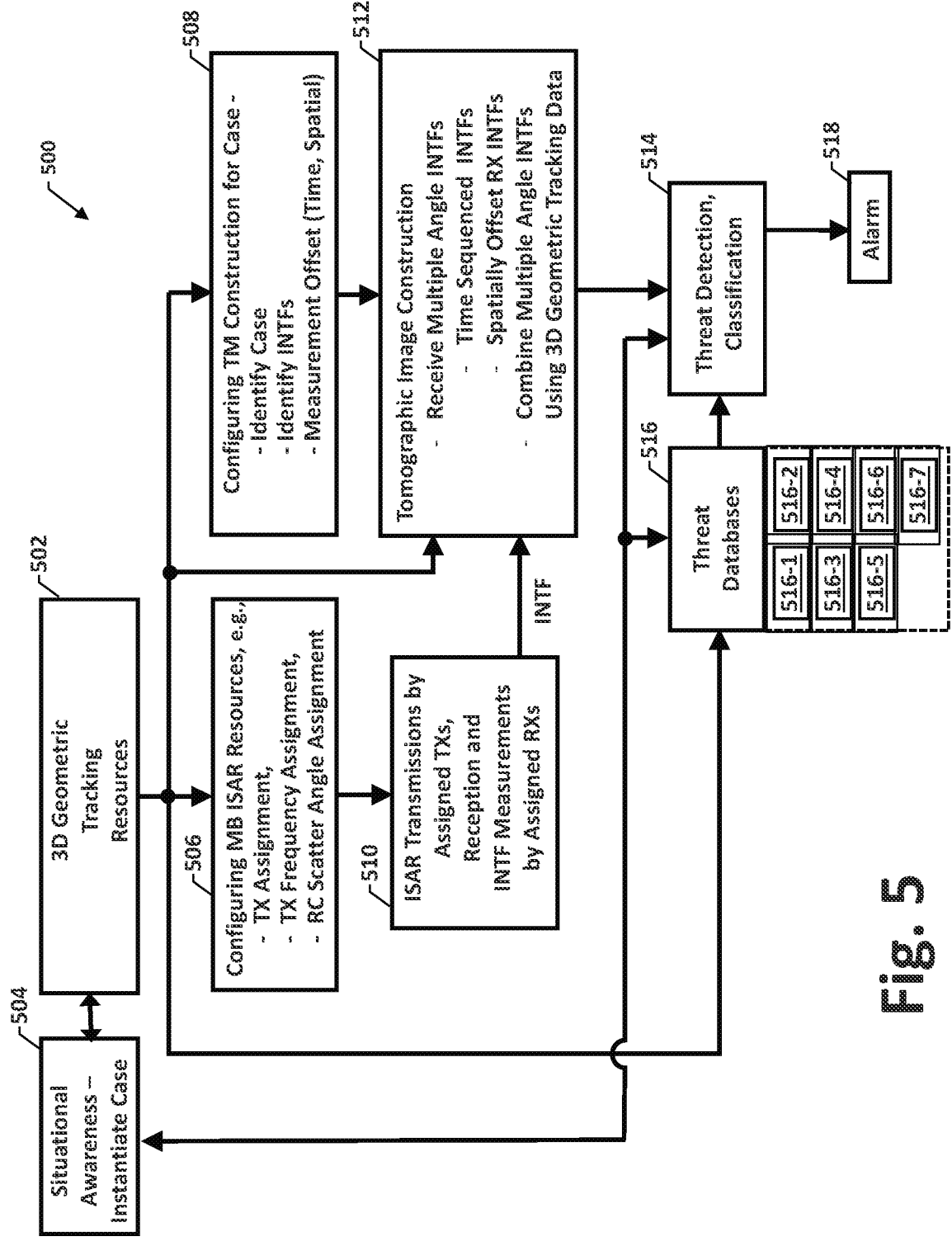
FIG. 5 shows a high level logic of operation flow in one general process in 3D geometric tracking assisted, multi-band, multi-angle ISAR concealed threat detection, supported on systems and methods in accordance with one or more embodiments.

FIG. 5 shows a high level logic of a general process 500 in 3D geometric tracking assisted, MB multiple TX/RX ISAR concealed threat detection, provided via various systems and methods accordance with disclosed embodiments. The general sequential arrangement of the flow 500 blocks corresponds to a new detection, e.g., by the 3D geometric tracker 108, of a subject in the monitored area. As will be understood, after a number of such detections, there may be concurrent ongoing operations corresponding to all blocks, e.g., in detecting, ISAR imaging, and threat classification for different ones of the subjects.

Referring to FIG. 5, based on ongoing 3D geometric tracking 502 by, for example, the 3D geometric tracker 106 a logic, such as the situational awareness logic 120 instantiates 504 what will be termed a new "case." Associated with instantiating 504, the process 500 can proceed to configuring 506 the ISAR TX-RCX resources, namely, assigning one or more of the MB radar TXs 108, assigning respective radar frequencies, and assigning MB radar RXs to receive scatter angles and generate interferometric measurements. Associated with the configuring 506 of the ISAR TX-RCX resources the process 500 can configure 508 the MB TM image construction logic 114 to construct tomographic images of the new case subject.

Configuring 506 can include providing a subject identifier, a 3D shape data, a 3D position data, and a 3D orientation data, e.g., from the 3D geometric tracker 106 to the TX/RX selection and frequency assignment logic 112.

Configuring 506 can also include indication to the MB radar RXs 110 of the time intervals over which to perform their respective interferometric measurements. The time intervals, and the identity of the respective MB radar RXs 110 defines the reception spacing for multiple scatter angles. The reception spacing can be time-subject movement spaced, or can be receiver position spaced, or both. The reception spacing can be defined for all of the one or more of the frequency bands of one or more of the MB TXs 108 that are assigned to a subject.

Upon the configuring 506, the process 500 can proceed to 510 and perform ISAR MB radar transmissions by the assigned MB radar TXs 108, reception of scatter angles corresponding interferometric measurements of the scatter angles by the assigned MB radar RXs 110.

Upon the configuring 508, the process 500 can proceed to 512 where the MB TM image construction logic 114 can receive multiple angle interferometric measurements from the MB radar RXs 110, and 3D movement and orientation information from the 3D geometric tracker 106 and construct TM images. The TM images can be constructed using time sequenced interferometric measurements, spatially offset interferometric measurements, or both.

The process 500 can include feeding to a threat classification 514 the TM images constructed at 512. In an embodiment, the threat classification 514 can receive threat information from a plurality of threat databases 516. Threat information can include subject identity management information, e.g., biometric matching information, and can include prohibited item database information. Selection of threat information from the threat databases 516 can be based, at least in part, on the 3D geometric tracking 502. In an embodiment, results of the threat classification 514 can trigger an alarm 518.

As mentioned above in reference to FIG. 1, systems according to one or more embodiments can include a plurality of databases. In accordance with such embodiments can include in the threat database 516 a first database 516-1, a second database 516-2, a third database 516-3, a fourth database 516-4, a fifth database 516-5, a sixth database 516-6, and a seventh database 516-7. In an implementation the first database 516-1 can be configured, for example, as a venue specific threat list. The first database 516-1 in this implementation will therefore be alternatively referenced as the "venue specific threat" database 516-1 and, in an example configuration, can include a list of energetics and a list of non-explosive prohibited items (NEPIs). The venue specific threat database 516-1 list of energetics can be sub-divided or grouped as known energetics, postulated energetics, and future energetics. The list of NEPIs can be similarly sub-divided or grouped as known NEPIs, postulated NEPIs, and future NEPIs.

In an implementation, the second database 516-2 can be configured as a benign database and for this implementation will therefore be alternatively referenced as the "benign" database 516-2. The "benign" database 516-2 can be configured to include known and seen at venue items, by season or by event, and configured to include future and existing items, which can be based on items, or clothing, or both, that can be purchased.

In an implementation, the third database 516-3 can be configured as a people traffic database. The third database 516-3 for this implementation will therefore be alternatively referenced as the "people traffic" database 516-3. The people traffic database 516-3 can be configured as sub-divided or grouped as publicly known people traffic, prior known people traffic, and unknown people traffic. The publicly known people traffic information stored in the people traffic database 516-3 can include known and suspected adversaries. The prior known people traffic can include known special traffic, for whom NEPIs are acceptable and credentials are approved. The 516-3 database also can include regulations or policy regarding temperature of individuals that can be used for system responses (or alarms) based on the system "measuring the temperature of individual people at a distance."

In an implementation, the fourth database 516-4 can be configured to store, for example, various fixed site or building priors and surrounding area priors. The fourth database 516-4 for this implementation will therefore be alternatively referenced as the "fixed building and surrounding area priors" database 516-4. The information can be venue specific, for efficiency in data storage, and for security reasons, e.g., to limit loss from an access breach to the information for the one venue. In an embodiment, information stored in the fourth database 516-4 can be used for mitigating interference with algorithms that use the electromagnetic wave properties of surrounding buildings and structures.

In an implementation, the fifth database 516-5 can be configured to include venue specific lists. Example lists can include lists of people, lists of accesses venues, entry portals, and lists of alarm responses.

In an implementation, the sixth database 516-6 can be configured to store venue actions based on alarms. The venue actions can be venue specific. The venue actions can be configured to indicate required approvals and further notification of venue staff, other approved third parties, local government or other government authorities.

In an implementation, the seventh database 516-7 can be configured to store venue history logs and events. The seventh database 516-7 for this implementation will therefore be alternatively referenced as the "venue history logs and events" database 516-7. In an embodiment, the seventh database 516-7 can be configured to store personal identifiable information (PII) in accordance with PII protection guidelines and regulations and the historical information relative to people traffic, and screening results, alarms and non-alarms, historical information persistence according to Government and venue policy.

Regarding the fourth database 516-4, as described above, example venues can include areas encompassing or proximal to moving structures, e.g., automobile parking lots, areas surrounding amusement park rides, and platforms or other standing areas adjacent, e.g., passenger train tracks, subway tracks, or short-route shuttle tracks, e.g., Disneyworld® trains. In such the various moving structures, e.g., moving automobiles, moving train cars, shuttle cars, and amusement ride structures, can intermittently pass adjacent subjects. In an embodiment, the fourth database 516-4 can be configured to store, in a venue-specific manner, information regarding the radar reflectivity, e.g., EM wave characterization) of the fixed or moving structures. Also, in one or more embodiments, the MB radar RXs 110, or the MB tomographic imaging logic 114, or both, can be configured to store algorithms that, using database information about the moving structures, or information, e.g., from the 3D geometric tracker 106, on the present state of such moving structures, can be used to mitigate unwanted reflections from the surfaces, or exploit the reflections, or both. such as the features for mitigating effects of the radar reflectivity of the moving structures, or both. This technique can also provide mitigation of occlusions and provide 360 degree observation of subjects.

Figure 6:
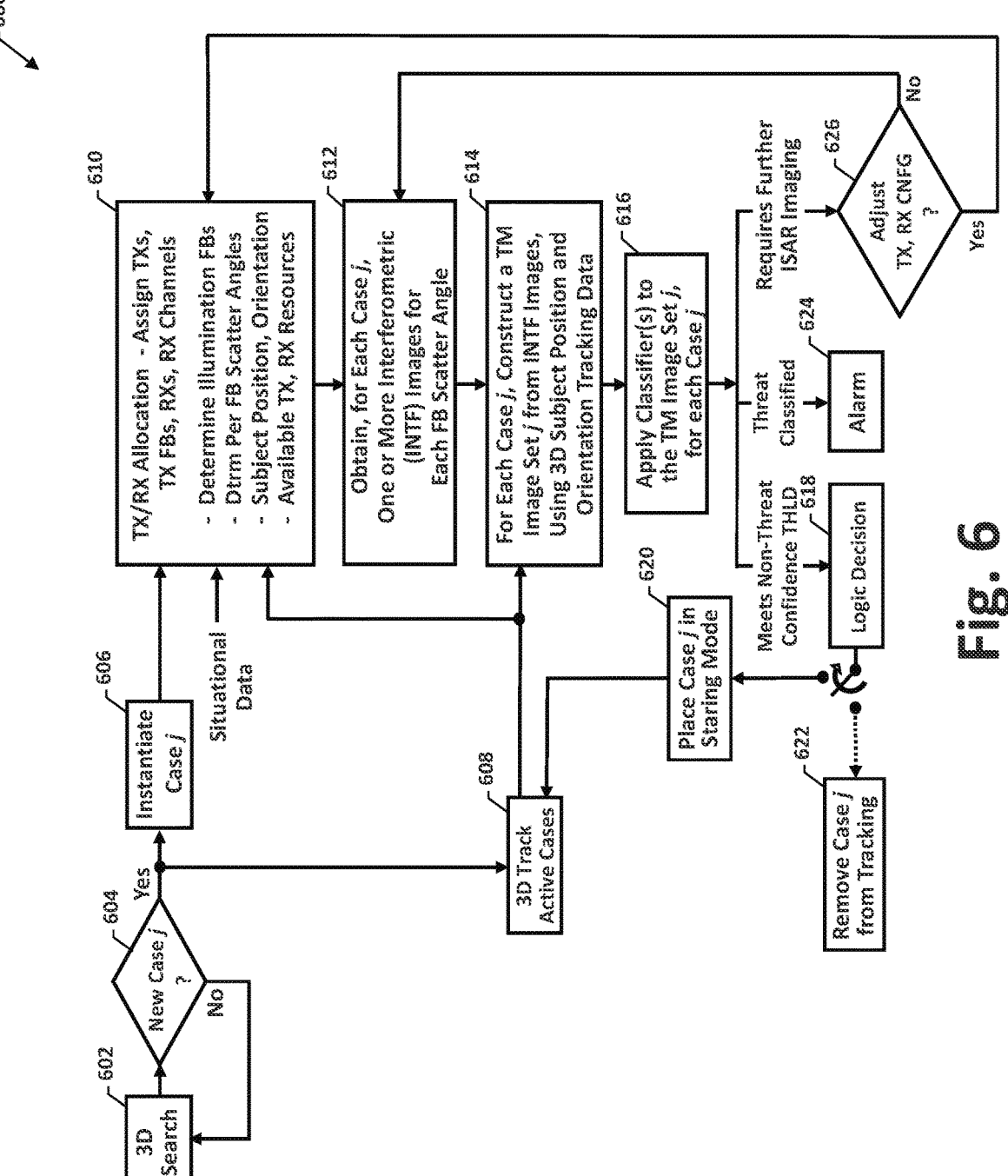
FIG. 6 shows a logic diagram of one example operational flow in one adaptation of the process described in reference to FIG. 5 in accordance with one or more embodiments.

FIG. 6 shows a logic diagram of one example operational flow 600 in one adaptation of the process described in reference to FIG. 5.

In an aspect, 3D search by the FIG. 1 3D by operations, for example, of the situational awareness logic 120 based on information from the 3D geometric tracker 106. Upon detection 604 of a new subject, the process 600 can proceed to instantiate 606 a new case. Instantiating 606 the case, in an embodiment, can include creating a subject-specific record. The subject-specific record that can include, for example, an initial identifier of the subject, such as "Subject j" or "Subject j+1," and can include the subject's initial co-ordinate position. The initial co-ordinate position may be, for example, a point on or proximal to the perimeter line MP. The subject record can include other fields, some of which may be filled at the instantiating 606, and some that may be filled in by subsequent operations, or in later iterations of the process 600.

In an embodiment, the 3D geometric tracker, e.g., the system 100 3D geometric tracker 106, may be configured to provide '½'ith the subject's initial 3D position and 3D orientation data, a 3D shape data. The 3D geometric tracker can be configured to provide 3D shape measurements with sufficient accuracy and resolution to enable extracting or otherwise determining usable information regarding various biometrics of the subject. Example biometrics can include, but are not limited to, height, weight, posture, or any combination or sub-combination thereof. In an embodiment, systems and methods may include a logic, e.g., in the 3D geometric tracker, configured to utilize the subject's biometric information carried by the 3D shape data, for purposes such as, for example and without limitation, a re-acquiring of 3D geometric tracking of the subject if the tracking is lost, e.g., by occlusion. In an embodiment, the biometric information carried by the 3D shape data can include facial features, sufficient for facial image matching. The facial image matching can be used for tracking re-acquisition as described above, and in one or more embodiments the facial features, and other biometric information, can be used in subject classification and other processes and operations, such as described in the following paragraphs.

In one or more embodiments, with respect to the subject's physical characteristics, the 3D geometric tracker may provide data describing a surface topology of the subject. In such embodiments, a logic, for example but not limited to resources of the situational awareness logic 120, perform measurements, estimations, or classification to obtain various biometric data for the subject.

Regarding other fields of the subject's record that can be created in the instantiating 606, examples can include, but are not limited to, a field for an external name, e.g., the subject's legal name, or an encryption thereof. In an embodiment, the subject's record can include, for example, an interim threat classification or categorization field. It will be understood that "interim," in this context can include a classification result indicating an elevated probability or likelihood of a potential risk and that, as determined, e.g., by a configuration of the situation awareness logic 120 or the 3D tracking and ISAR fusion logic 118, a confidence value of the interim threat classification or categorization may be improved by further MB ISAR illumination and TM imaging, as will be described in subsequent paragraphs. In one or more embodiments, certain of the subject record field fields may be empty or null at the instantiating 606, and may be filled or optionally filled during subsequent logic blocks of the process 600. Also, in an aspect, either instead of or in addition to threat indicating fields of the regularly instantiated subject record, as described above, a separate record or event flag may be instantiated, and managed by a separate process.

Associated with, e.g., concurrent with or following the instantiating 606, the process 600 can proceed to initiate and maintain 608 3D geometric tracking of the subject. In an embodiment, the "maintain" aspect of the 3D geometric tracking at 608 can continue until an exit condition is reached. In other words, it will be understood when reading the description that follows of operations of successively numbered blocs, that 3D geometric tracking of the subject at 608 will continue—until the exit condition is met.

From the instantiating 606, the process 600 can proceed to TX/RX allocation 610 for the new case subject j. In an embodiment, operations in the TX/RX allocation 610 can include, for example, determining the MB FBs for illuminating the subject, assigning MB radar TXs 108 to perform the MB illuminations, assigning particular MB radar RXs 110 to receive scatter angles, and assigning and configuring RX channels of the RXs 110 to perform interferometric measurements of the received scatter angles. Illumination FBs can be determined based on a plurality of factors. Examples can include, but are not limited to, climate and time of year, as these can correlate to apparel material and thickness. Other examples can include, without limitation, information from the 3D geometric tracker regarding the subject's biometrics, information regarding the subject's rate of motion, and a current availability of MB radar TX resources.

Factors in the considered in TX/RX allocation 610 operations of determining scatter angles to receive and perform interferometric measurements of can include, without limitation, and in addition to the above factors, 3D tracker information indicating the subject's 3D orientation, specification(s) of a particular surface area or surface areas of the subject to illuminate, and a map of the MB radar RX distribution. In addition, determining scatter angles to receive and perform interferometric measurements of, can be based, in part, on the respective positions of the specific MB radar TXs allocated to perform the illuminating. Accordingly, in an embodiment, operations in the TX/RX allocation 610 can include one or more back-and-forth iterations, e.g., allocating MB radar TXs, followed by operations toward allocation of MB radar RXs to receive the determining scatter angles and, if the latter is not possible, modifying the allocation of MB radar TXs, and repeating operations toward allocation of MB radar RXs. An example modification of the above can be a reversal, i.e., designating MB radar RXs, followed by operations toward allocating MB radar TXs to obtain specified illumination, subject to the specified scatter angles being receivable by the designated MB radar RXs. In an aspect, operations in the TX/RX allocation 610, e.g., determining illumination FBs and scatter angles, can also be based, at least in part, on situational awareness data.

For the subject described as causing the initiating 606, the process 600 can proceed from 610 to MB radar illumination and interferometric measuring 612. The illumination operations in 612 can be in accordance with the MB radar TXs determined at 610, and the interferometric measurement operations at 612 can be in accordance with MB radar RXs allocated at 610. For the subject described as causing the initiating 606, the process 600 can proceed from the MB radar illumination and interferometric measuring 612 to constructing 614 TM images of the area or areas of the subject. The TM construction can be based, at least in part, based on the said interferometric measurements, using the 3D geometric tracking data to resolve ambiguities in aligning the different scatter angle measurements.

With respect to the subject described as causing the initiating 606, the process 600 can proceed from the constructing 614 to classifying 616. Proceeding from the classifying 616 can be determined by said operation's result. For example, if the classifying 616 indicates, to a requisite confidence level, that the subject is safe, the process 600 can proceed to a decision 618 of whether to place, e.g., the subject under a staring mode 620 monitoring or to remove 622 the instantiated subject case and the tracking of the subject. In an embodiment, the decision 618 can be fixed, e.g., at time of installation. In another embodiment, the decision can be configured to perform the selection based on various factors. Example factors can include, but are not limited to, crowd density, and situation assessment. Referring to the result of the classifying 616, in another scenario the result may indicate a threat and, in an embodiment, the process 600 can in response proceed to an alarm state 624. Referring again to the classifying 616, in still another scenario, a logic operations, e.g., by the situation assessment logic 120, or by the 3D tracking/ISAR fusion logic 118 that additional ISAR MB imaging is necessary. In an embodiment, in association with the determining additional ISAR MB imaging is necessary, there is a determining 626 of whether to adjust the configuration (abbreviated "CNFB" in FIG. 6) of the MB radar TX and MB radar RX resources.

Figure 7:
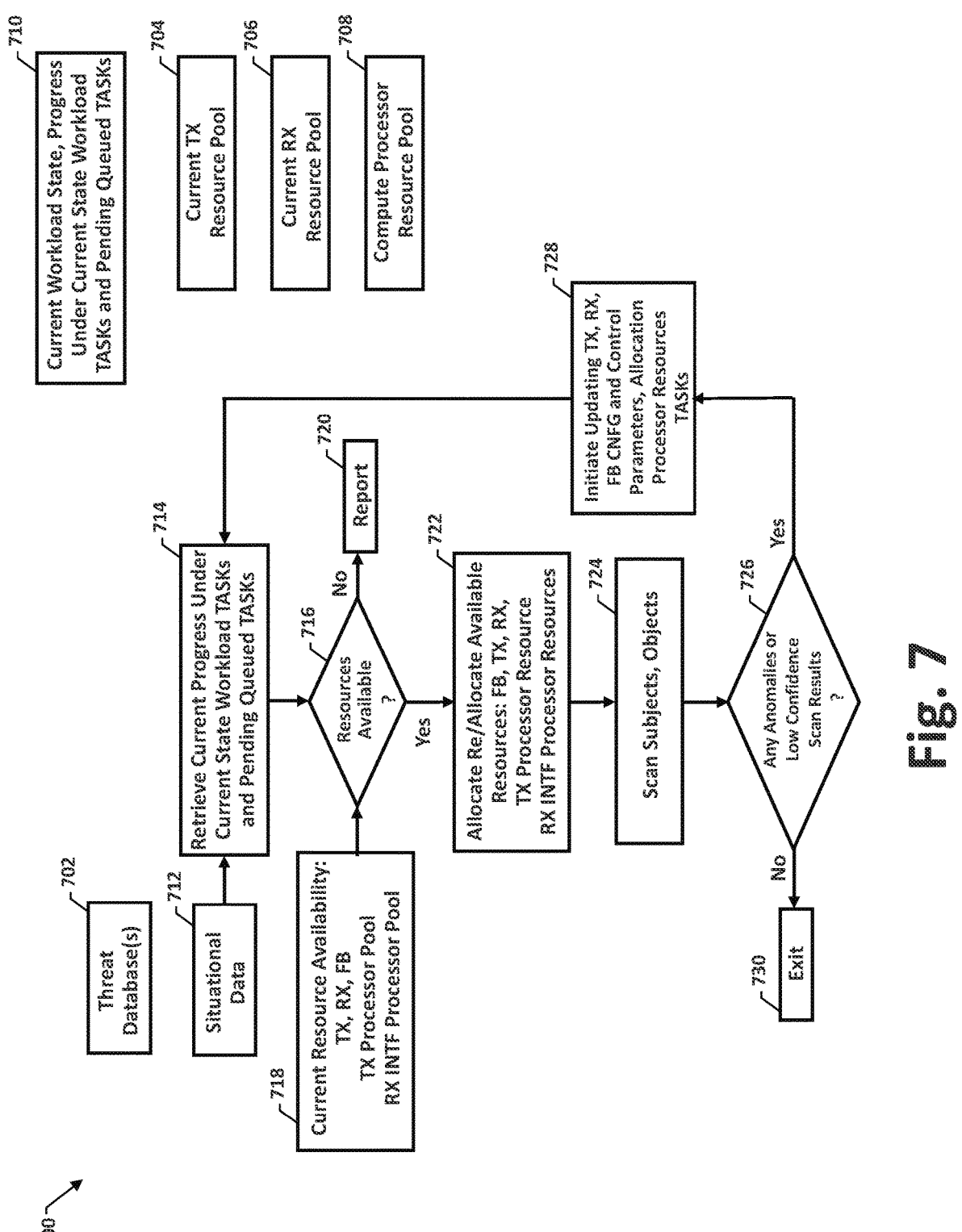
FIG. 7 shows a logic diagram of a multiband radar signal configuration and transmitter-receiver allocation algorithm in an implementation of the FIG. 6 process, in accordance with one or more embodiments.

FIG. 7 shows a logic diagram 700 of a logic flow in a MB radar signal configuration and TX-RX allocation in an implementation of the FIG. 6 process, in accordance with disclosed embodiments. In an embodiment, the logic flow of the MB radar signal configuration and TX-RX allocation algorithm can access one or more threat databases 702, such as the threat databases 516 described above. Also, in an implementation, operations include, e.g., as background processes, maintaining what may be real-time inventories of available resource pools, e.g., current TX resource pool 704, current RX resource pool 708, and current processor resource pool 708. It will be understood that blocks 704, 706, and 708 are logic blocks, and that implementations may merge function of one or more of the resource pools 704, 706, and 708. In an embodiment, background processes can also include maintaining a current workload and case state file 710, which can include, for example, a listing of current active cases, and for each a status, e.g., resolved, not-yet-resolved.

An example instance of a process according to the diagram 700 (hereinafter "flow 700") can begin with an event report carried by situational data 712, e.g., instantiation of a the case as described above. From the situational data 712 event report, the flow 700 can proceed to retrieving 714 a current workload and case state file as described above, and can then proceed to determining 716 whether resources are available. The determining can include retrieving 718 a current resource availability, e.g., retrieving or accessing the current TX resource pool 704, the current RX resource pool 706, and the current process resource pool 708. In an embodiment operations can include, to reduce overhead of accessing the individual pools 704-708, a pre-processing preparation of an always-ready-to-send unitary report containing requisite information from all of the pools 704-708.

Referring to FIG. 7, in instances where the determining 716 produces a negative outcome, the flow 700 can proceed to a report 720 operation. In an embodiment, operations associated with reporting 720 can include automatic temporary allocation of resources.

Assuming a positive result of the determining 718, the flow 700 can proceed to allocating FB resources, e.g., TX resources, RX resources, and associated TX processor and RX processor resources, including RX interferometric measurement resources to the new case. In an embodiment, the flow 700 can include sending, directly or initiating such sending by the situational awareness logic 120, of notice to the FIG. 1 MB ISAR TM imaging logic 114 and threat classification and alarm logic 118.

The flow 700, upon allocating FB resources, e.g., TX resources, RX resources, and associated TX processor and RX processor resources, can proceed to scanning 724 the subjects or objects associated with the new case. The flow

700, upon receiving a result from the FIG. 6 application of classifiers 616, can proceed to determining whether a result of the classifiers 616 shows, for example, any anomalies or low-confidence scan results. In instances where the determining 726 indicates "yes," the flow 700 can proceed to initiating updating 728 of allocation of FB resources, e.g., TX resources, RX resources, and associated TX processor and RX processor resources. In such instances, the flow 700 can return to retrieving 714 a current workload and case state file as described above. The above-described determining 726 and initiating updating 728 can be an implementation of the FIG. 6 combination of the "requires further ISAR imaging" output of the classifiers 616 and adjusting TX/RX CNFG 626. In instances where the determining 726 indicates "no," the flow 700 can proceed to exit operation 730. Examples of exit operations 730 can implementation-specific.

Figure 8:
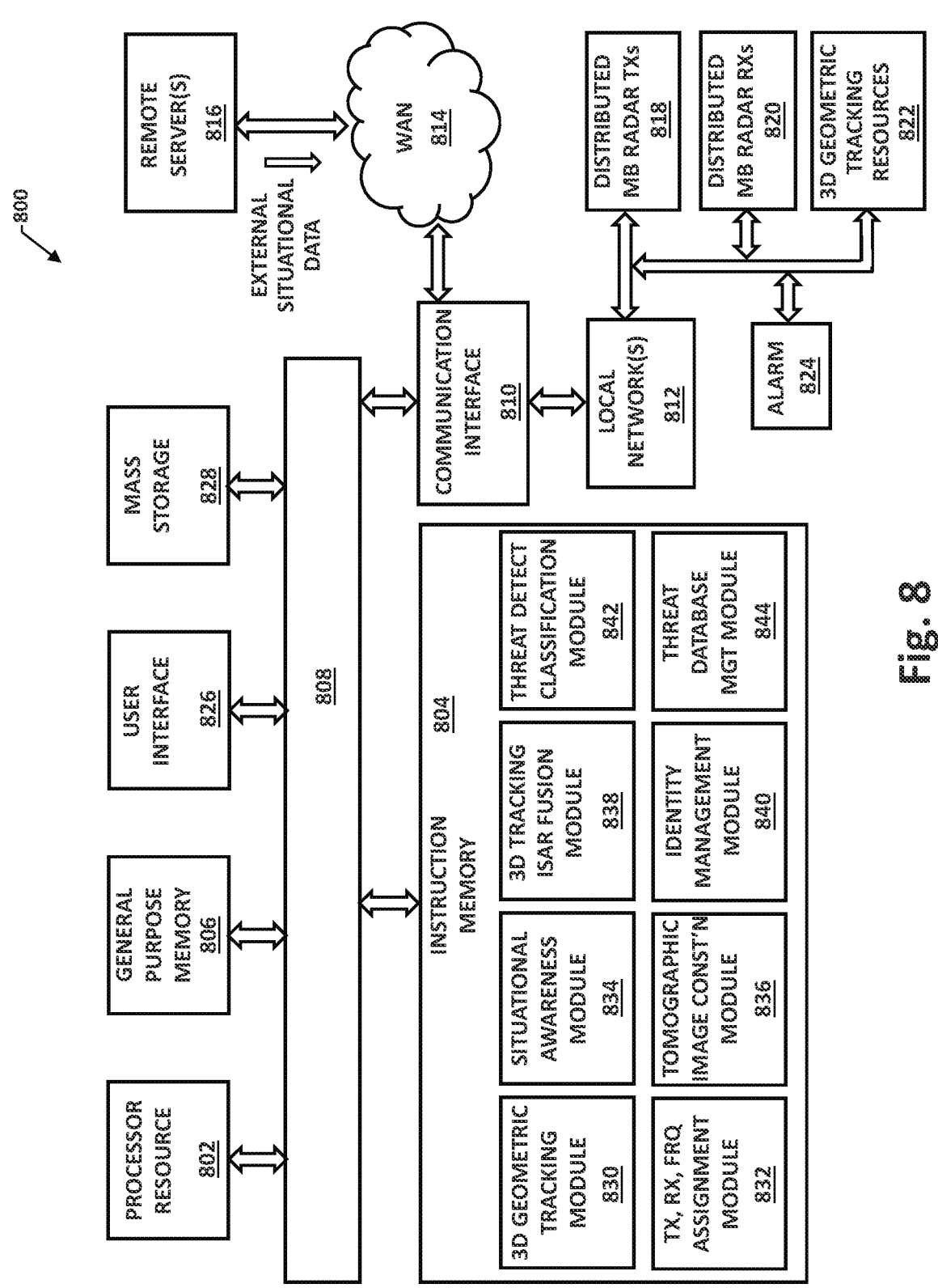
FIG. 8 shows a computer system configured to perform various operations and processes in accordance with one or more embodiments.

FIG. 8 shows a computer system 800 upon which aspects of this disclosure may be implemented. It will be understood that functional blocks illustrated in FIG. 8 are logical blocks, and do not necessarily correspond to particular hardware. The computer system 800 may include a processing resource 802 communicatively coupled to an instruction memory 804 and a general purpose memory 806 by a bus 808 for processing information. It will be understood that the instruction memory 804 and the general purpose memory 806 are not necessarily implemented by physically separate hardware. For example, the instruction memory 804 and the general purpose memory 806 can be respective regions, virtual or physical, of a common memory resource.

The computer system 800 may also include a communication interface 810 communicatively coupled to the bus 808, for two-way data communication to local resources, via local network 812. The communication interface 810 may provide, for example through an Internet Service Provider (ISP), connection via a wide area network (WAN) 814, e.g., the Internet, to a remote server 816. The local network 812 can connect, for example, to distributed MB radar TXs 818, e.g., the FIG. 1 MB radar TXs 108, and to distributed MB radar RXs 820, e.g., the FIG. 1 MB radar RXs 119, and to 3D geometric tracking resources 822, e.g., the FIG. 1 3D geometric tracker 106, or the FIG. 3 3D structured light track logic 306. The FIG. 8 computer system, 800 local network 812 can also connect to an alarm 824, such as the FIG. 5 alarm 518. The computer system 800 can include, e.g., connected to the bus 808, a user interface 826, and a mass storage 828. The computer system 800 may be coupled via the bus 808 to a user interface 818. The user interface 818 can include a display and can be configured for receiving various user inputs, such as user command selections and communicating these to the processor 802, or to the general purpose memory 806. The user interface 818 can include physical structure, or virtual implementation, or both, providing user input modes or options, for controlling, for example, a cursor, visible to a user through display or through other techniques, and such modes or operations may include, for example virtual mouse, voice I/O, trackball, or cursor direction keys.

The instruction memory 804 and the general purpose memory 806 can be implemented, for example, by one or more random-access memory devices (RAM)s or other dynamic storage device, coupled to the bus 808 for storing information and executable instructions to be executed by the processor 802. The executable instructions can include instruction that, when executed by the processor 802, cause the processor to perform operations in accordance with the flow diagrams of one or more of FIGS. 5 and 6. In an implementation, the executable instructions can be configured as modules that, when executed by the processor, cause the processor to implement a particular logic function or combination of logic functions. FIG. 8 shows an example module configuration that includes, but is not limited to, 3D geometric tracking module 830, TX, RX, frequency assignment module 832, situational awareness module 834, and a tomographic image construction module 836. The modules implemented by the executable instructions stored in the instruction memory 804 can also include a 3D tracking and ISAR fusion module 838, a subject database management module 840, a threat detection and classification module 842, and a threat database management module 844.

The general purpose memory 806 may also be used for storing temporary variables or other intermediate information during execution of instructions by the processor 802.

In some examples, hard-wired circuitry may be used in place of or in combination with software instructions. The term "machine-readable medium" as used herein refers to any medium that participates in providing data that causes a machine to operate in a specific fashion. Such a medium may take forms, including but not limited to, non-volatile media, volatile media, and transmission media. Non-volatile media may include, for example, optical or magnetic disks, such the mass storage device 828. Transmission media may include optical paths, or electrical or acoustic signal propagation paths, and may include acoustic or light waves, such as those generated during radio-wave and infra-red data communications, that are capable of carrying instructions detectable by a physical mechanism for input to a machine.

The instructions also may include program elements, such as an operating system. While execution of sequences of instructions in the program causes the processor 802 to perform the process steps described herein, hard-wired circuitry may be used in place of, or in combination with, software/firmware instructions for implementation of the processes of the present embodiments. Thus, the present embodiments are not limited to any specific combination of hardware and software.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

As used herein the terms "comprising," "having," "including," and "containing" are to be understood, except where clearly indicated otherwise, as being open-ended terms (e.g., as meaning "including, but not limited to,") except where clearly stated otherwise.

As used herein in the context of a description of a mechanical feature or aspect, the terms "coupled" and "connected" are to be understood to encompass being mechanically coupled or connected, in a permanent, semi-permanent, or removable manner, as well any one among and any combination or sub-combination of: partly or wholly contained, joined together, attached, secured, mounted, and adhered, either directly to one another or through intervening structure(s).

As used herein, the terms "interfacing," "communicatively connected," and "communicatively coupled" and the like, in the context of operative relation, interaction, control, feedback, or other correspondence between or among functions, modules, logic blocks, or other entities are to be understood as encompassing a possessing or being readily switchable to a mode of possessing a functionality, or operability or capability, having operability or capability, of performing, performing operations in, or initiating a communicating of information, directly or indirectly, wirelessly or wired, encrypted or unencrypted, through any means, including but not limited to circuit network, packet-switching network, reconfigurable point-to-point, or fixed point-to-point, and any combination or sub-combination thereof.

It will be understood that the ordering of description herein of operations in methods and processes is not intended as any limitation on the order in which the operations may be performed in practices of disclosed methods and processes. It will be understood that sequential description herein of operations is not intended to limit practices in accordance with this disclosure to performing the described operations in an order, temporal or locational, separate from another, either in terms of time or location.

The use of any and all examples, and use exemplary language (e.g., "such as"), is intended merely to better illuminate examples of the disclosure and does not pose a limitation on the scope of the disclosure unless otherwise claimed.

The Abstract of the Disclosure is provided to allow the reader to quickly identify aspects of the disclosed subject matter. It is not intended as a limitation on the scope or meaning of the claims.

In the Detailed Description, various features are grouped together in various examples for purposes of streamlining the disclosure. The groupings are not to be interpreted as an indication or implication that any claim requires more features than the claim expressly recites. On the contrary, each appended claim stands on its own as a separately claimed subject matter and therefore each of the appended claims is hereby incorporated into the Detailed Description.

What is claimed:

1. A system for detecting and classifying concealed items, comprising:

a three-dimensional (3D) geometric tracker, configured to detect within a monitor area a position of a subject and an orientation of the subject, and correspondingly generate a subject 3D position data and a subject 3D orientation data;

a multiband inverse synthetic aperture array radar (ISAR) system, coupled to the 3D geometric tracker, comprising:

a plurality of first frequency band radar receivers (RXs), respectively located at different first frequency receiving positions that are within and/or adjacent the monitoring area, and a plurality of second frequency band radar RXs, respectively located at different second frequency receiving positions that are within and/or adjacent the monitoring area, wherein the multiband ISAR system is configured to:

transmit, from a first position, a first frequency band radar signal that is generated based at least in part on a first transmit oscillator signal and is configured to illuminate the subject sufficiently to produce, in instances of a concealed item on the subject, a plurality of different angles of scatter of the first frequency band radar signal from the concealed item, at least two of which are received at respective ones among the plurality of first frequency band radar RXs, including:

a first angle of scatter of the first frequency band radar signal, received at a first of the first frequency band radar RXs as a received first angle of scatter of the first frequency band radar signal, and a second angle of scatter of the first frequency band radar signal, received at a second of the first frequency band radar RXs as a received second angle of scatter of the first frequency band radar signal, transmit, from a second position, a second frequency band radar signal that is based at least in part on a second transmit oscillator signal and is configured to illuminate the subject sufficiently to produce, in the instances of a concealed item on the subject, a plurality of different angles of scatter of the second frequency band radar signal from the concealed item, at least two of which are received by respective ones among the plurality of second frequency band RCs, including:

a first angle of scatter of the second frequency band radar signal, received at a first of the second frequency band radar RXs as a received first angle of scatter of the second frequency band radar signal, and a second angle of scatter of the second frequency band radar signal, received at a second of the second frequency band radar RXs as a received second angle of scatter of the second frequency band radar signal, wherein the multiband ISAR system further comprises:

a first interferometer, configured to generate a first frequency first angle interferometric measurement, based at least in part on the received first angle of scatter of the first frequency band radar signal and a first oscillator signal that is synchronous with the first transmit oscillator signal, a second interferometer, configured to generate a first frequency second angle interferometric measurement, based at least in part on the received second angle of scatter of the first frequency band radar signal and a third oscillator signal that is synchronous with the first transmit oscillator signal, a third interferometer, configured to generate a second frequency first angle interferometric measurement, based at least in part on the received first angle of scatter of the second frequency band radar signal and a third oscillator signal that is synchronous with the second transmit oscillator signal, a fourth interferometer, configured to generate a second frequency second angle interferometric measurement, based at least in part on the received second angle of scatter of the second frequency band radar signal and a fourth oscillator signal that is synchronous with the second transmit oscillator signal;

a processing logic, configured to perform a tomographic image construction process, comprises steps that include:

constructing a first frequency tomographic image of the concealed item on the subject, which comprises a tomographic combining of the first frequency first angle interferometric measurement and the first frequency second angle interferometric measurement that includes an aligning of the first frequency first angle interferometric measurement and the first frequency first angle interferometric measurement, which is configured such that instances of ambiguities arise and is further configured to include resolving, based at least in part on the subject 3D position data and the subject 3D orientation data, of said instances of ambiguities the first frequency construct a second frequency tomographic image of the concealed item on the subject, by a tomographic processing that is based at least on the second frequency first angle interferometric measurement and the second frequency second angle interferometric measurement and further based at least in part on the subject 3D position data and the subject 3D orientation data the first frequency; and a processing logic, which is configured to determine, based at least in part on the first frequency tomographic image, or the second frequency tomographic image, or both, whether a threat likelihood meets a trigger threshold and, in response to a positive determination, to activate an alarm.

2. The system of claim 1, wherein the multiband ISAR system further comprises:

a first multiband radar transmitter (TX) positioned at the first position and configured to:

transmit the first frequency band radar signal as a first TX first frequency band radar signal, and selectively, in response to a first TX enablement-configuration control, transmit a first TX second frequency band radar signal; and a second multiband radar TX positioned at the second position and configured to:

transmit the second frequency band radar signal as a second TX first frequency band radar signal, and selectively, in response to a second TX enablement-configuration control, transmit a second TX second frequency band radar signal at a second TX second frequency band, wherein the processing logic is coupled to the first multiband radar TX and is coupled to the second multiband radar TX and is further configured to perform the first TX enablement-configuration control and to perform the second TX enablement-configuration control.

3. The system of claim 1, further comprising:

a gallery of reference profiles, the gallery comprising a reference benign item profile and a reference prohibited item profile, the reference benign item profile comprising a reference benign item tomographic image profile and the reference prohibited item profile comprising a reference prohibited item tomographic image profile; and an item classifier, communicatively connected to the gallery of reference profiles and to the threat alarm logic, configured to determine, based at least in part on the first frequency tomographic image of the concealed item and the reference prohibited item profile, and/or the second frequency tomographic image of the concealed item and the reference prohibited item profile, whether the subject is carrying a prohibited item.

4. The system of claim 1, wherein the 3D geometric tracker is further configured to generate, in a detecting of the subject, a subject 3D shape data, in addition to the subject 3D position data and the subject 3D orientation data, and to generate the subject 3D shape date, the subject 3D position data, and the subject 3D orientation data as a subject 3D tracking data, and wherein the system further comprises:

an identity management database, the database comprising a plurality of threat subject records stored in a tangible storage medium, each threat subject record comprising a threat subject identifier (ID) and a threat subject biometrics data;

an identity management logic, coupled to the 3D geometric tracker and coupled to the identity management database, wherein the identity management logic is configured to generate a threat subject matching indicator, based at least in part on the subject 3D shape data of at least one of detected subjects and the respective threat subject biometrics data of the identity management database, the threat subject matching indicator indicating there is a likelihood that at least one of the detected subjects matches at least one of the threat subject records; and a dynamic frequency assignment controller, configured to assign or to adjust, or both, based at least in part on receiving the matching indicator, the first frequency band, or the second frequency band, or both.

5. The system of claim 4, wherein:

the threat subject biometrics field of at least one of the threat subject records is configured to hold a body movement profile, and the threat subject matching logic is further configured to generate the matching indicator further based at least in part on the subject 3D tracking data of the detected subject.

6. The system of claim 1, further comprising a dynamic frequency assignment controller, coupled to the sensor, and configured to assign the first frequency band, the first TX second frequency band, the second TX first frequency, or the second TX second frequency, or any combination or subcombination thereof, based, at least in part, on the subject 3D data.

7. A method for concealed threat detection and classification, comprising:

detecting within a monitor area a position of a subject and an orientation of the subject, and correspondingly generating a subject 3D position data and a subject 3D orientation data;

transmitting from a first position a first frequency band radar signal that is generated based at least in part on a first transmit oscillator signal and transmitting from a second position a second frequency band radar signal that is generated based at least in part on a second transmit oscillator signal, wherein the first frequency band radar signal is configured to illuminate the subject sufficiently to produce, in instances of a concealed item on the subject, a plurality of different angles of scatter of the first frequency band radar signal from the concealed item, including a first angle of scatter of the first frequency band radar signal and a second angle of scatter of the first frequency band radar signal, and the second frequency band radar signal is configured to illuminate the subject sufficiently to produce, in instances of the concealed item on the subject, a plurality of different angles of scatter of the second frequency band radar signal from the concealed item, including a first angle of scatter of the second frequency band radar signal and a second angle of scatter of the second frequency band radar signal;

receiving, at a first reception position, the first angle of scatter of the first frequency band radar signal, as a received first angle of scatter of the first frequency band radar signal, and receiving, at a second reception position, the second angle of scatter of the first frequency band radar signal, as a received second angle of scatter of the first frequency band radar signal;

receiving, at a third reception position, the first angle of scatter of the second frequency band radar signal, as a received first angle of scatter of the second frequency band radar signal, and receiving, at a fourth reception position, the second angle of scatter of the second frequency band radar signal, as a received second angle of scatter of the second frequency band radar signal;

generating a first frequency first angle interferometric measurement, based at least in part on the received first angle of scatter of the first frequency band radar signal and a first oscillator signal that is synchronous with the first transmit oscillator signal, generating a first frequency second angle interferometric measurement, based at least in part on the received second angle of scatter of the first frequency band radar signal and a second oscillator signal that is synchronous with the first transmit oscillator signal;

generating a second frequency first angle interferometric measurement, based at least in part on the received first angle of scatter of the second frequency band radar signal and a third oscillator signal that is synchronous with the second transmit oscillator signal;

generating a second frequency second angle interferometric measurement, based at least in part on the received second angle of scatter of the second frequency band radar signal and a fourth oscillator signal that is synchronous with the second transmit oscillator signal;

constructing a first frequency tomographic image of the concealed item on the subject, by a tomographic combining of the first frequency first angle interferometric measurement and the first frequency second angle interferometric measurement that comprises an aligning of the first frequency first angle interferometric measurement and the first frequency first angle interferometric measurement, by an aligning process that includes an arising of ambiguities and a resolving, based at least in part on the subject 3D position data and the subject 3D orientation data, of the ambiguities;

constructing a second frequency tomographic image of the item on the subject, by a tomography processing that is based at least on the second frequency first angle interferometric measurement and the second frequency second angle interferometric measurement and further based at least in part on the subject 3D position data and the subject 3D orientation data; and determining, based at least in part on the first frequency tomographic image, or the second frequency tomographic image, or both, whether a threat likelihood meets a trigger threshold and, in response to a positive determination, activating an alarm.

8. The method of claim 7, further comprising:

transmitting the first frequency band radar signal from a first TX at the first position, as a first TX first frequency band radar signal, and the first frequency band as a first TX first frequency band;

transmitting, from the first TX at the first position, a first TX second frequency band radar signal, at a first TX second frequency band;

transmitting the second frequency band radar signal from a second TX at the second position, as a second TX first frequency band radar signal, and the second frequency band as a second TX first frequency band; and transmitting, from the second TX at the second position, a second frequency band radar signal, at a second TX second frequency band.

* * * * *